(12) United States Patent
Livshits et al.

(10) Patent No.: US 9,708,185 B2
(45) Date of Patent: Jul. 18, 2017

(54) DEVICE FOR PRODUCING A GASEOUS FUEL COMPOSITE AND SYSTEM OF PRODUCTION THEREOF

(75) Inventors: David Livshits, San Francisco, CA (US); Lester Teichner, Chicago, IL (US)

(73) Assignee: Turbulent Energy, LLC, Lexington, MA (US)

( * ) Notice: Subject to any disclaimer, the term of this patent is extended or adjusted under 35 U.S.C. 154(b) by 1599 days.

(21) Appl. No.: 12/947,991

(22) Filed: Nov. 17, 2010

(65) Prior Publication Data

US 2011/0126462 A1    Jun. 2, 2011

Related U.S. Application Data

(63) Continuation-in-part of application No. 12/529,625, filed as application No. PCT/US2008/075374 on Sep.
(Continued)

(51) Int. Cl.
*B01F 5/00* (2006.01)
*C01B 3/36* (2006.01)
*F23D 14/62* (2006.01)

(52) U.S. Cl.
CPC ............ *C01B 3/363* (2013.01); *B01F 5/0062* (2013.01); *F23D 14/62* (2013.01);
(Continued)

(58) Field of Classification Search
CPC .................................................... B01F 5/0062
(Continued)

(56) References Cited

U.S. PATENT DOCUMENTS

| 927,825 | A | * | 7/1909 | Smith et al. | 239/468 |
| 2,080,616 | A | * | 5/1937 | George et al. | 423/160 |

(Continued)

FOREIGN PATENT DOCUMENTS

| DE | 3723618 | 12/1988 |
| DE | 4211031 | 10/1993 |

(Continued)

OTHER PUBLICATIONS

International Search Report for International Application No. PCT/US2008/75366, Nov. 13, 2008, 2 pp.
(Continued)

*Primary Examiner* — David Sorkin
(74) *Attorney, Agent, or Firm* — Smith Tempel Blaha LLC; Gregory Scott Smith

(57) ABSTRACT

The invention relates to a gaseous fuel composite, a device for producing the gaseous fuel composite, and subcomponents used as part of the device for producing the gaseous fuel composite, and more specifically, to a gaseous composite made of a gas fuel such as natural gas and its oxidant such as air for burning as part of different systems such as fuel burners, combustion chambers, and the like. The device includes several vortex generators each with a curved aerodynamic channel amplifier to create a stream of air to aerate the gas as successive stages using both upward and rotational kinetic energy. Further, a vortex generator may have an axial channel with a conical shape or use different curved channel amplifiers to further create the gaseous fuel composite.

6 Claims, 28 Drawing Sheets

Related U.S. Application Data 5, 2008, now abandoned, application No. 12/947,991, which is a continuation-in-part of application No. 12/529,617, filed as application No. PCT/US2008/075366 on Sep. 5, 2008, now Pat. No. 8,746,965, application No. 12/947,991, which is a continuation-in-part of application No. 12/990,942, filed as application No. PCT/US2009/043547 on May 12, 2009, now abandoned.

(60) Provisional application No. 60/970,655, filed on Sep. 7, 2007, provisional application No. 60/974,909, filed on Sep. 25, 2007, provisional application No. 60/978,932, filed on Oct. 10, 2007, provisional application No. 61/012,334, filed on Dec. 7, 2007, provisional application No. 61/012,337, filed on Dec. 7, 2007, provisional application No. 61/012,340, filed on Dec. 7, 2007, provisional application No. 61/037,032, filed on Mar. 17, 2008, provisional application No. 61/052,317, filed on May 12, 2008.

(52) U.S. Cl.
CPC ...... *C01B 2203/025* (2013.01); *C01B 2203/1241* (2013.01); *C01B 2203/1276* (2013.01)

(58) Field of Classification Search
USPC ...... 366/165.1, 165.2, 165.4, 165.5; 239/468
See application file for complete search history.

(56) References Cited

U.S. PATENT DOCUMENTS

| | | | |
|---|---|---|---|
| 3,735,778 A | | 5/1973 | Garnier |
| 3,980,233 A | | 9/1976 | Simmons et al. |
| 4,087,862 A | * | 5/1978 | Tsien .................. 366/165.1 |
| 4,215,081 A | | 7/1980 | Brooks |
| 4,218,012 A | | 8/1980 | Hamza et al. |
| 4,398,827 A | | 8/1983 | Dietrich |
| 4,399,107 A | | 8/1983 | Bose |
| 4,415,275 A | | 11/1983 | Dietrich |
| 4,464,314 A | | 8/1984 | Surovikin et al. |
| 4,474,477 A | * | 10/1984 | Smith et al. .............. 366/165.5 |
| 4,553,504 A | | 11/1985 | Duggal et al. |
| 4,812,049 A | | 3/1989 | McCall |
| 4,917,152 A | | 4/1990 | Decker |
| 4,954,147 A | | 9/1990 | Galgon |
| 5,174,247 A | | 12/1992 | Tosa et al. |
| 5,176,448 A | | 1/1993 | King et al. |
| 5,183,335 A | | 2/1993 | Lang et al. |
| 5,193,341 A | | 3/1993 | Sibbertsen et al. |
| 5,330,105 A | | 7/1994 | Kaylor |
| 5,449,114 A | | 9/1995 | Wells et al. |
| 5,452,955 A | | 9/1995 | Lundstrom |
| 5,460,449 A | | 10/1995 | Kent et al. |
| 5,492,404 A | | 2/1996 | Smith |
| 5,492,409 A | | 2/1996 | Karlsson et al. |
| 5,575,561 A | | 11/1996 | Rohwer |
| 5,657,631 A | | 8/1997 | Androsov |
| 5,678,766 A | | 10/1997 | Peck et al. |
| 5,820,256 A | | 10/1998 | Morrison |
| 5,865,158 A | | 2/1999 | Cleveland et al. |
| 5,918,465 A | | 7/1999 | Schmid |
| 5,992,529 A | | 11/1999 | Willaims |
| 6,022,135 A | | 2/2000 | Williams |
| 6,027,241 A | | 2/2000 | King |
| 6,036,356 A | | 3/2000 | Yang et al. |
| RE36,969 E | | 11/2000 | Streiff et al. |
| 6,170,978 B1 | | 1/2001 | Short |
| 6,367,262 B1 | | 4/2002 | Mongia et al. |
| 6,422,735 B1 | | 7/2002 | Lang |
| 6,432,148 B1 | | 8/2002 | Ganan-Calvo |
| 6,534,023 B1 | | 3/2003 | Liou |
| 6,669,843 B2 | | 12/2003 | Arnaud |
| 6,986,832 B2 | | 1/2006 | Lamminen et al. |
| 7,018,435 B1 | | 3/2006 | Wentinck |
| 7,041,144 B2 | | 5/2006 | Kozyuk |
| 7,165,881 B2 | | 1/2007 | Holl |
| 7,448,794 B2 | | 11/2008 | Hansen |
| 2002/0115034 A1 | | 8/2002 | Liu |
| 2003/0166965 A1 | | 9/2003 | Wolfert et al. |
| 2004/0125689 A1 | * | 7/2004 | Ehrfeld et al. ............ 366/165.1 |
| 2006/0150643 A1 | | 7/2006 | Sullivan |
| 2007/0137590 A1 | | 6/2007 | Vetrovec |
| 2007/0206435 A1 | | 9/2007 | Lester et al. |
| 2008/0016968 A1 | | 1/2008 | McCall et al. |
| 2008/0194868 A1 | | 8/2008 | Kozyuk |

FOREIGN PATENT DOCUMENTS

| | | |
|---|---|---|
| DE | 29612769 | 12/1996 |
| DE | 10310442 | 9/2004 |
| EP | 0044498 | 1/1982 |
| FR | 2313706 | 12/1976 |
| GB | 823502 | 11/1959 |
| GB | 2263649 | 8/1993 |
| GB | 2334901 | 9/1999 |
| JP | 56130213 | 10/1981 |
| JP | 62079835 | 4/1987 |
| JP | 51161899 | 6/1993 |
| JP | 8131800 | 5/1996 |
| JP | 2001000849 | 1/2001 |
| JP | 2006326498 | 12/2006 |
| KR | 20040040926 | 5/2004 |
| RU | 2133829 | 7/1999 |
| SU | 1662653 | 7/1991 |
| WO | WO88/06493 | 9/1988 |
| WO | WO93/07960 | 4/1993 |
| WO | 94/08724 | 4/1994 |
| WO | WO00/12202 | 3/2000 |
| WO | WO2006/038810 | 4/2006 |
| WO | WO2006/117435 | 11/2006 |
| WO | WO2007/086897 | 8/2007 |
| WO | WO2007/115810 | 10/2007 |
| WO | WO2009/021148 | 2/2009 |
| WO | WO2009/035334 | 3/2009 |
| WO | WO2009/140237 | 11/2009 |

OTHER PUBLICATIONS

Written Opinion for International Application No. PCT/US2008/75366, Nov. 13, 2008, 5 pp.
International Search Report for International Application No. PCT/US2008/75374, Mar. 23, 2008, 4 pp.
Written Opinion for International Application No. PCT/US2008/75374, Mar. 23, 2008, 8 pp.
International Search Report for PCT Application No. PCT/US2009/043547, 1 page.
European Search Report dated Oct. 10, 2014 issued in connection with EP App. No. 08799214.5, 9 pages.

* cited by examiner

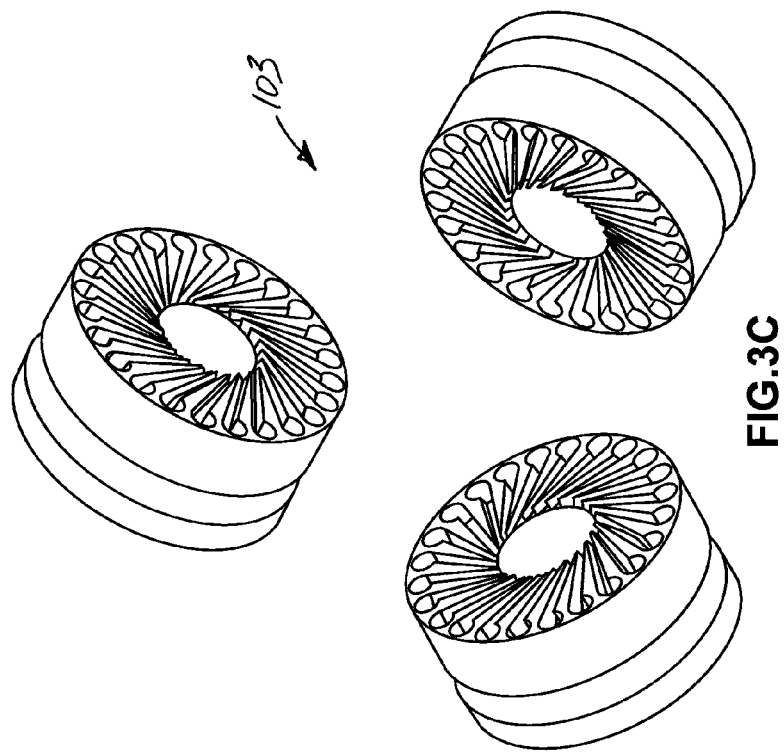
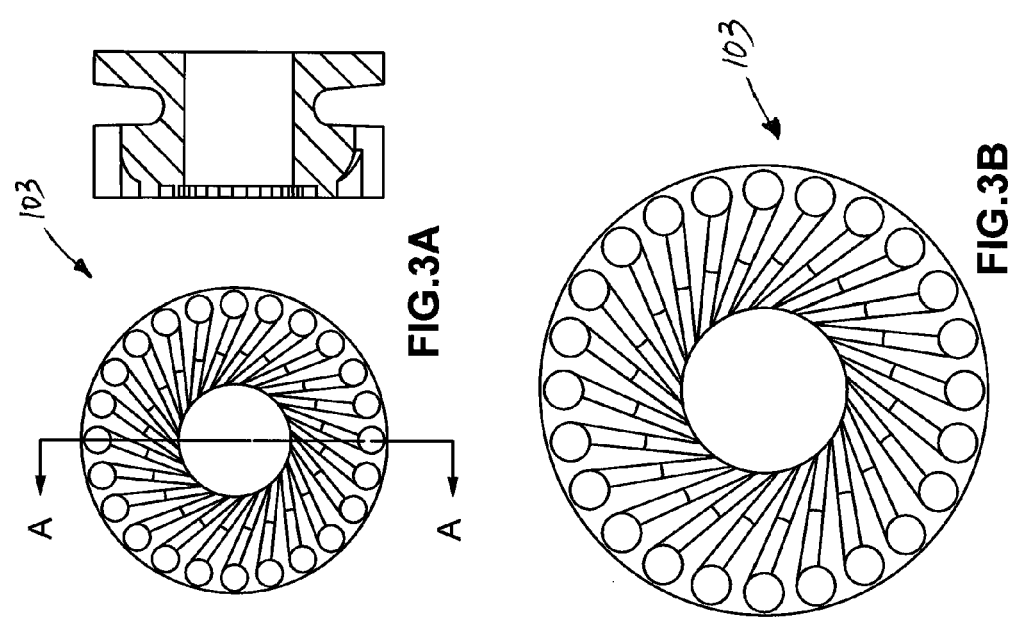
FIG.3C
FIG.3A
FIG.3B

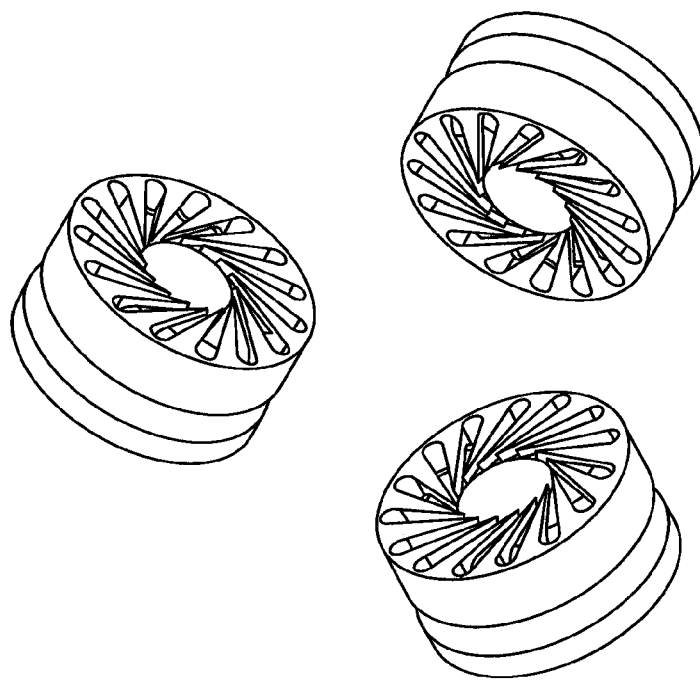
FIG. 6A
FIG. 6C
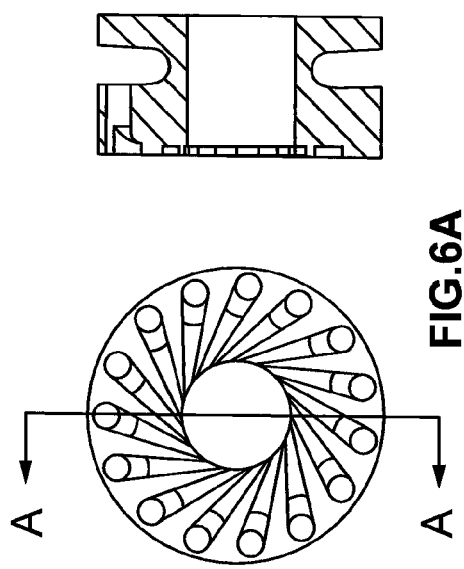
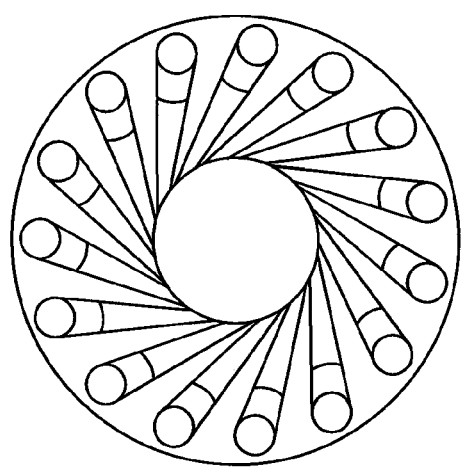
FIG. 6B

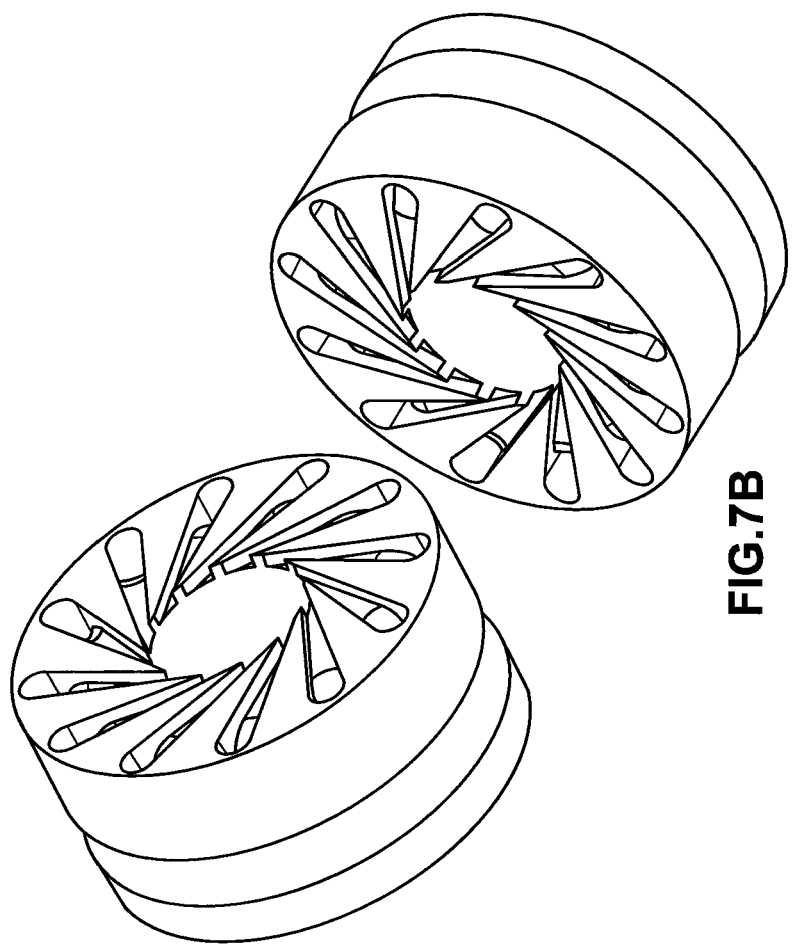
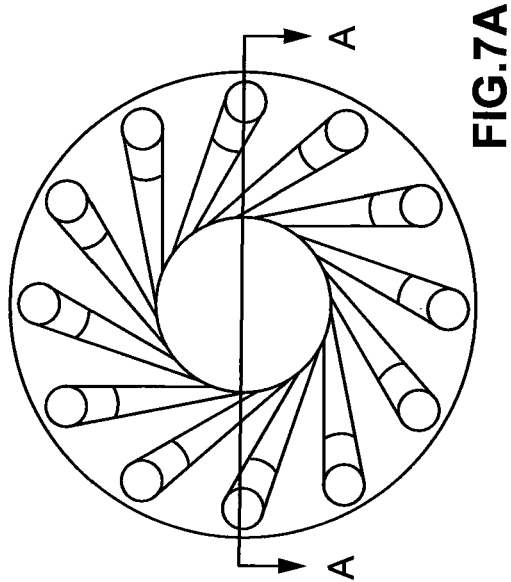
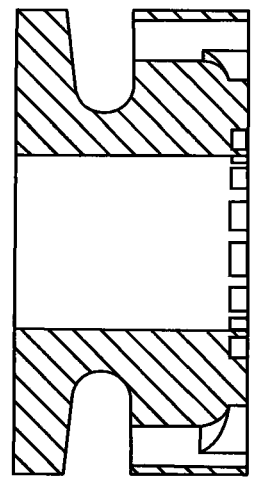
FIG.7A
FIG.7B

DEVICE FOR PRODUCING A GASEOUS FUEL COMPOSITE AND SYSTEM OF PRODUCTION THEREOF

CROSS-REFERENCE TO RELATED APPLICATIONS

This application is a Continuation-in-Part of U.S. Patent App. No. 12/529,625, filed on Apr. 15, 2010, now abandoned which is the national stage filing of International Patent App. No. PCT/US08/75374 and claims the benefit of U.S. Provisional App. No. 60/970,655, filed on Sep. 7, 2007, U.S. Provisional App. No. 60/974,909, filed on Sep. 25, 2007, U.S. Provisional App. No. 60/978,932, filed on Oct. 10, 2007, U.S. Provisional App. No. 61/012,334, filed on Dec. 7, 2007, U.S. Provisional App. No. 61/012,337, filed on Dec. 7, 2007, U.S. Provisional App. No. 61/012,340, filed on Dec. 7, 2007, and U.S. Provisional App. No. 61/037,032, filed on Mar. 17, 2008; this application is a Continuation-in-Part of U.S. Patent Application No. 12/529,617, filed Sep. 2, 2009, now U.S. Pat. No. 8,746,965 which is the national stage filing of International Patent App. No. PCT/US08/075366, and claims the benefit of U.S. Provisional App. No. 60/970,655, filed on Sep. 7, 2007, U.S. Provisional App. No. 60/974,909, filed on Sep. 25, 2007, U.S. Provisional App. No. 60/978,932, filed on Oct. 10, 2007, U.S. Provisional App. No. 61/012,334, filed on Dec. 7, 2007, U.S. Provisional App. No. 61/012,337, filed on Dec. 7, 2007, U.S. Provisional App. No. 61/012,340, filed on Dec. 7, 2007, and U.S. Provisional App. No. 61/037,032, filed on Mar. 17, 2008; and this application is a Continuation-in-Part of U.S. Patent Application No. 12/990,942, filed Nov. 3, 2010, now abandoned which is the national stage filing of International Patent App. No. PCT/US2009/043547, filed May 12, 2009, and claims priority to U.S. Provisional App. No. 61/052,317, filed May 8, 2008.

The following applications are incorporated by reference in their entirety: (i) U.S. Provisional Application Nos. 60/970,655, 60/974,909, 60/978,932, 61/012,334, 61/012,337 61/012,340, 61/037,032, and 61/052,317; International Application Nos. PCT/US08/75374, PCT/US08/075366, and PCT/US2009/043547; and U.S. Application Nos. 12/529,625 and 12/529,617.

FIELD OF THE INVENTION

The invention relates to a gaseous fuel composite, a device for producing the gaseous fuel composite, and subcomponents used as part of the device for producing the gaseous fuel composite, and more specifically, to a gaseous fuel composite made of a fuel such as natural gas and its oxidant such as air for burning as part of different systems such as fuel burners, combustion chambers, and the like.

BACKGROUND

Mixing of components is known. The basic criteria for defining efficiency of a mixing process relates to those parameters that define the uniformity of a resultant mix, the energy needed to create this change in parameters, and the capacity of the mix to maintain those different new conditions. In some technologies, such as the combustion of a biofuel, an organic fuel, or any other exothermic combustible element, there is a desire for an improved method of mixing a combustible element with its oxidant or with other useful fluids as part of the combustion process. The mixture of a liquid fraction with a gas is visible to the human eye, and as such, a person can easily understand the need to reduce a liquid into small droplets to improve contact surface area between the carburant and its oxidant.

The mixture of two liquids is also as equally intuitive to comprehend. Most people are experienced with mixing two liquids in a volume to achieve a complete mixture. For example, it is known that some liquids mix easily such as a syrup into sparkling water, while others such as vinegar in oil do not. The mixture of two gasses is harder to observe, even more so when the gasses are invisible to the human eye. The false belief that two gasses mix completely without the need for activation energy or dynamic energy is widespread. For example, tritium gas has unique properties: it is explosive and the molecules adhere to surfaces and flow downward under normal gravity. Each gas and thus any mixture of gases is accordingly unique, and the mixture of gasses presents challenges that are often complex and counterintuitive.

One known example of a visible gas-gas mixture is the creation of smoke rings by a smoker into the atmosphere. Another example is the release of a warm, humid, $CO_2$-enriched breath on a cold winter day, creating a plume of visible water condensation and evaporation in the cold atmosphere. One of the main problems with gas-gas mixtures is the failure to understand how molecules of gas interact and move in contact with other molecules where a first set of molecule has a first kinetic energy level and a first specific linear velocity and the second set of molecules has a second kinetic energy level and a second specific linear velocity.

Several technologies are known to help with the combustion of fuel, such as nozzles that spray a fuel within an oxidant using pressurized air, eductors, atomizers, or venturi devices. Some of these technologies are more effective than mechanical mixing devices, and these devices generally act upon only one components to be mixed (i.e., the fuel or the oxidant) to create a dynamic condition and an increase of kinetic energy. Engines such as internal combustion engines burn fuel to power a mechanical device. The inefficiencies of internal combustion engines result in a portion of the fuel failing to combust during a fuel cycle, the creation of soot, or the burning of fuel at less than optimal rates. The inefficiency of engines or combustion chamber conditions can result in increased toxic emissions into the atmosphere and can require a larger or inefficient amount of fuel to generate a desired level of energy. Various processes are used to attempt to increase the efficiency of combustion.

In chemistry, a mixture results from the mix of two or more different substances without chemical bonding or chemical alteration. The molecules of two or more different substances, in fluid or gaseous form, are mixed to form a solution. Mixtures are the product of blending of substances like elements and compounds, without chemical bonding or other chemical change, so that each substance retains its own chemical properties and makeup. Composites can be the mixture of two or more fluids, liquids, gasses, or any combination thereof. For example, a fluid composite may be created from a mixture of a fossil fuel and its oxidant such as air. While one type of composite is described, one of ordinary skill in the art will recognize that any type of composite is contemplated.

Another property of composites is the change in overall properties while each of the constituting substances retains its own properties when measures locally. For example, the boiling temperature of a composite may be the average boiling temperature of the different substances forming the composite. Some composite mixtures are homogenous while others are heterogeneous. A homogenous composite is a mixture whose composition in one area of space cannot be identified, while a heterogeneous mixture is a mixture with a composition that can easily be identified since there are two or more phases are present.

What is needed is a new fluid composite having desirable overall properties and characteristics, and more specifically, a new fuel composite with properties of enhanced fuel burning, improved burn rates, greater heat production from the fuel, better spread of the thermal distribution in an environment, and other such gains. What is also needed is an improved device for mixing gasses using turbulent stream technology.

SUMMARY

The invention relates to a gaseous fuel composite, a device for producing the gaseous fuel composite, and sub-components used as part of the device for producing the gaseous fuel composite, and more specifically, to a gaseous composite made of a gas fuel such as natural gas and its oxidant such as air for burning as part of different systems such as fuel burners, combustion chambers, and the like. The device includes several vortex generators, each with a curved aerodynamic channel amplifier to create a stream of air to aerate the gas in successive stages using both upwards and rotational kinetic energy. Further, a vortex generator may have an axial channel with a conical shape or use different curved channel amplifier to further create the gaseous fuel composite.

BRIEF DESCRIPTION OF THE DRAWINGS

Certain embodiments are shown in the drawings. However, it is understood that the present disclosure is not limited to the arrangements and instrumentality shown in the attached drawings.

FIG. 3A is a top view and the associated plan view along cut line A-A of the vortex generator ring of FIG. 3.

FIG. 3B is a top view of the vortex generator ring of FIG. 3.

FIG. 3C is a series of three isometric views at different orientations of the vortex generator ring of FIG. 3.

FIG. 6A is a top view and the associated plan view along cut line A-A of the vortex generator ring of FIG. 6.

FIG. 6B is a top view of the vortex generator ring of FIG. 6.

FIG. 6C is a series of three isometric views at different orientations of the vortex generator ring of FIG. 6.

FIG. 7A is a top view of the vortex generator ring of FIG. 7 a along with a plan view see from cut line A-A.

FIG. 7B is a series of two isometric views at different orientations of the vortex generator ring of FIG. 7.

DETAILED DESCRIPTION

Figure 1:
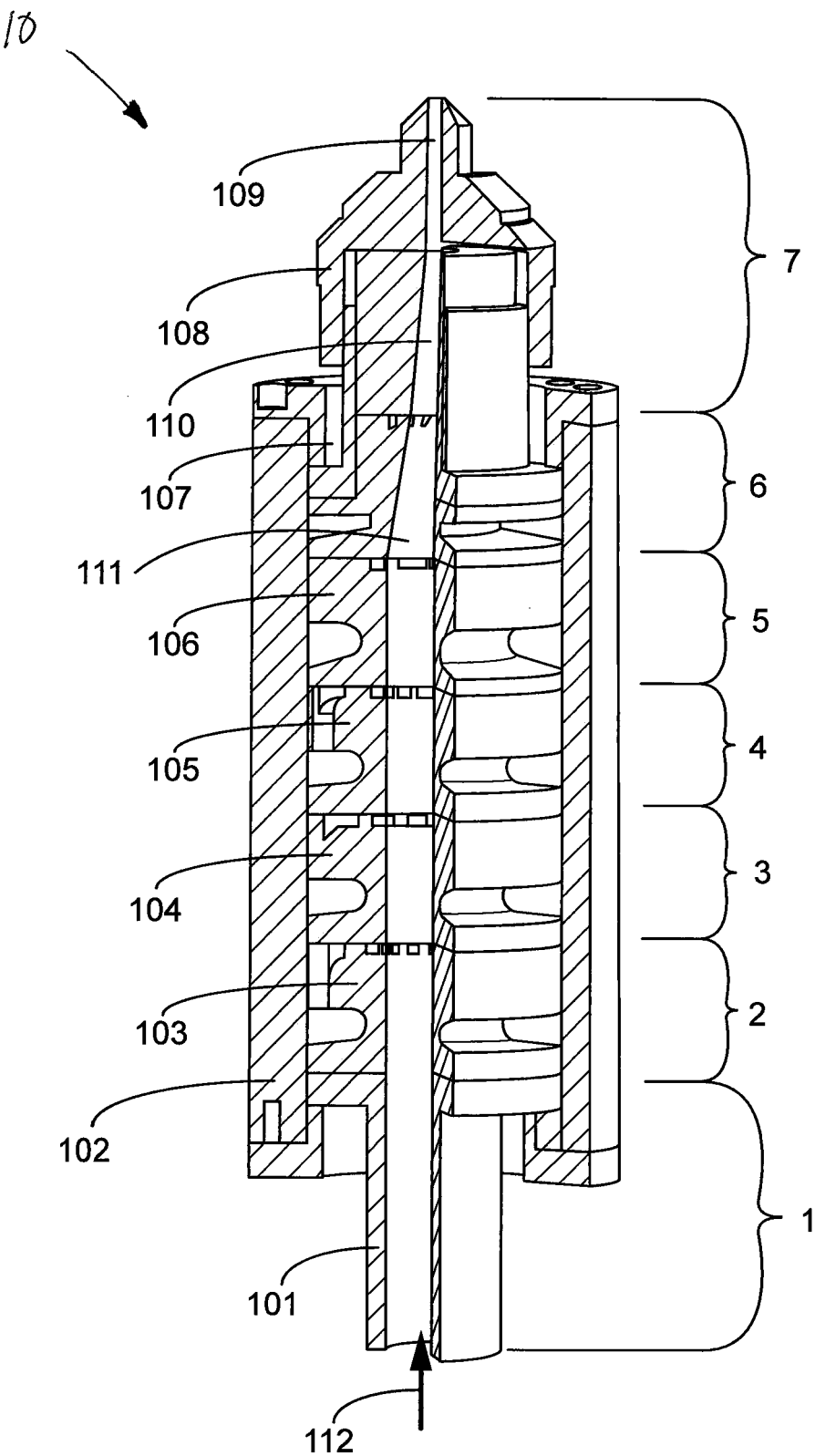
FIG. 1 is the device of FIG. 1A where ¾ of the radius is illustrated in volumetric solid and the front left quarter has been removed to better illustrate the different elements of the embodiment of the present disclosure.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

Incorporation by Reference

The following specification incorporates by reference all figures, disclosures, claims, headers, and titles of International Application Nos. PCT/US08/75374, filed Sep. 5, 2008, entitled "Dynamic Mixing of Fluids," and PCT/US08/075,366, also filed on Sep. 5, 2008, entitled "Method of Dynamic Mixing of Fluids," along with nationalized U.S. application Ser. Nos. 12/529,625, filed Sep. 2, 2009, entitled "Dynamic Mixing of Fluids," and 12/529,617, filed Sep. 2, 2009, entitled "Method of Dynamic Mixing of Fluids," and International Application No. PCT/US2009/043547, filed on May 12, 2009, also entitled "System and Apparatus for Condensation of Liquid from Gas and Method of Collection of Liquid."

Energy Efficiency Test

In one embodiment, methane gas ($CH_4$) is used as the fuel gas and air containing oxygen gas ($O_2$) is used as the oxidant of the methane gas. The chemical equation associated with the combustion of the methane is described as: $CH_4 + 2O_2 = CO_2 + 2H_2O$. Two molecules of water are created during this process and two molecules of oxygen are needed for the combustion.

At room pressure, with 1 mol of gas taking the volume of 22.4 liters, a volume of 22.4 m$^3$ of methane gas corresponds to 1000 mol of gas where this gas having a molar mass of 16.042 g/mol producing a weight of 16.042 kg of $CH_4$ for the 1000 mol of gas. The weight of the oxygen needed for the combustion is 64.0192 kg based on a molar mass at room temperature of 32.0096 g/mol and produces 36.03 kg of water at a molar mass of 18.015 g/mol.

In a burner, a flow of methane of 1000 scf/h enters the combustion chamber (1 scf=28.32 liters, 1000 scf/h=28.32 m$^3$/h, or 1264 mol/h). At the flow rate of 1000 scf/h, the reaction requires 80.92 kg/h of oxygen, and produces 45.514 kg/h of water.

In one test, 9,700 scf/h of air is introduced into the device to produce a gaseous fuel composite. Air has 21% oxygen, so the oxygen introduced is 2,037 scf/h. This volume is taken as the stoichiometric ratio of methane to air for combustion. The gaseous fuel composite has a total weight of 10,670 scf/h (1000 scf/h of methane and 9,700 scf/h of air).

The optimal thermal output for methane gas is 891 kj/mol or 840 BTU/mol (1 BTU=1.06 kj). Burning of 1000 scf/h of methane or 1264 mol/h of methane corresponds to 1,061,760 BTU/h of thermal output. The real thermal energy released is found to be 90% of the maximal output or approximately 955,585 BTU/h for a natural gas.

A test was conducted with and without the device shown in FIG. 1 installed on a commercial burner. Without the device, the following was measured: air input $T_{ai}$=3° C. (37° F.), air output $T_o$=66° C. (152° F.), with $\Delta T=T_o-T_{ai}$=63° C., air input humidity 68% with $c_{air}$=1.018 kj/(kg° K) resulting in 64.134 kj or 60.848 BTU of energy used to heat the air from the combustion of the gaseous fluid composite. As 10,911 scf of air was used, corresponding to 309 liters of air or 370.8 kg of air, the heating energy was 23,780 kj or 22,652 BTU.

With the device, the volume of the fuel composite being 1000 scf/h and 2,448 scf of air with a 29% volume of gas in the fuel composite, a total of 45.51 kg of water is released per hour if no other source of intake is taken outside of the gaseous fuel composite. The thermal efficiency taken at 90% of the theoretical value of 955,585 BTU/h for a gas with 29% of methane is 277,119 BTU/h.

With the device for producing the gaseous fuel composite, air input $T_{ai}$=11° C. (52° F.), air output $T_o$=85.5° C. (185.5° F.), with $\Delta T=T_o-T_{ai}$=74.5° C., air input humidity 87% with $c_{air}$=1.027 kj/(kg° K) resulting in 76.5115 kj or 72.59 BTU of energy used to heat the air from the combustion of the gaseous fluid composite. With a volume of air of 10,741 scf during the heat exchange corresponding to 365.022 kg of air, the energy needed to heat is 26,497 BTU.

As a consequence, 26,497 BTU are used to warm the air using the device for producing the gaseous fuel composite when compared with 22,652 BTU without the device. The increased output with the device is 3,845 BTU or approximately 17%. This corresponds to the increase in thermal efficiency of burning of the natural gas when it is first transformed into a gaseous fuel composite.

Carbon Oxide Release Test

Under normal circumstances, gas is sent out into a burner using an atomizer where the natural gas is dispersed in air in an open chamber. In the gaseous fuel composite device as shown in FIG. 1, a gas fuel composite created with air is merged into the natural gas before it is released into the burner. In a test, 100% of stoichiometric air was provided in a furnace via the atomizer with at least 10% excess air. The monoxide of carbon concentration under high fire is 1,093 ppm (or mg) for a gas flow of 1000 scf/h, and with a ratio of 1:5 on the concentration of CO and $CO_2$, the concentration is 5,465 ppm (or mg) for the same input volume. For a lower gas flow of 505.241 scf/h corresponding to a low-fire condition, the CO concentration is 3,999.36 ppm and the concentration of $CO_2$ is 20,000 ppm.

In a test with the device for producing a gaseous fuel composite as shown in FIG. 1, only 25% of the stoichiometric air is inserted into the natural gas to form the composite at a ratio of 1:2.425. In addition, another 10% in volume of air was added from the furnace for a total of 35% air. For a high-fire condition with a natural gas flow of 1000 scf/hr, 259.76 ppm of CO were measured, and by analogy, 1298.8 ppm of $CO_2$ are found. At a low-fire condition of 504.76 scf/hr of natural gas, the concentration of CO measured is 823.46 ppm and $CO_2$ is 4,115 ppm.

When compared to high-fire conditions, the production of CO is reduced from 1,093 to 259.76 ppm, and at low-fire conditions is reduced from 3,999.36 to 823.46 ppm, reductions of 23.8% and 20.6%, respectively. Therefore, it is found that by creating a gaseous fuel composite, even with a small fraction of the stoichiometric air, thermal efficiency improves significantly and production of undesired byproducts is reduced greatly. Atomizer design in the device for producing a gaseous fuel composite allows for optimization of fuel burning and the degradation of unburned fuel. When using an actual gas burner where the thermal efficiency can be as low as 60% to 65%, what is contemplated is improvements in thermal efficiency and degradation of byproducts, impurities, or other unburned fuel elements as part of the process.

Device for Producing a Gaseous Fuel Composite

Figure 1A:
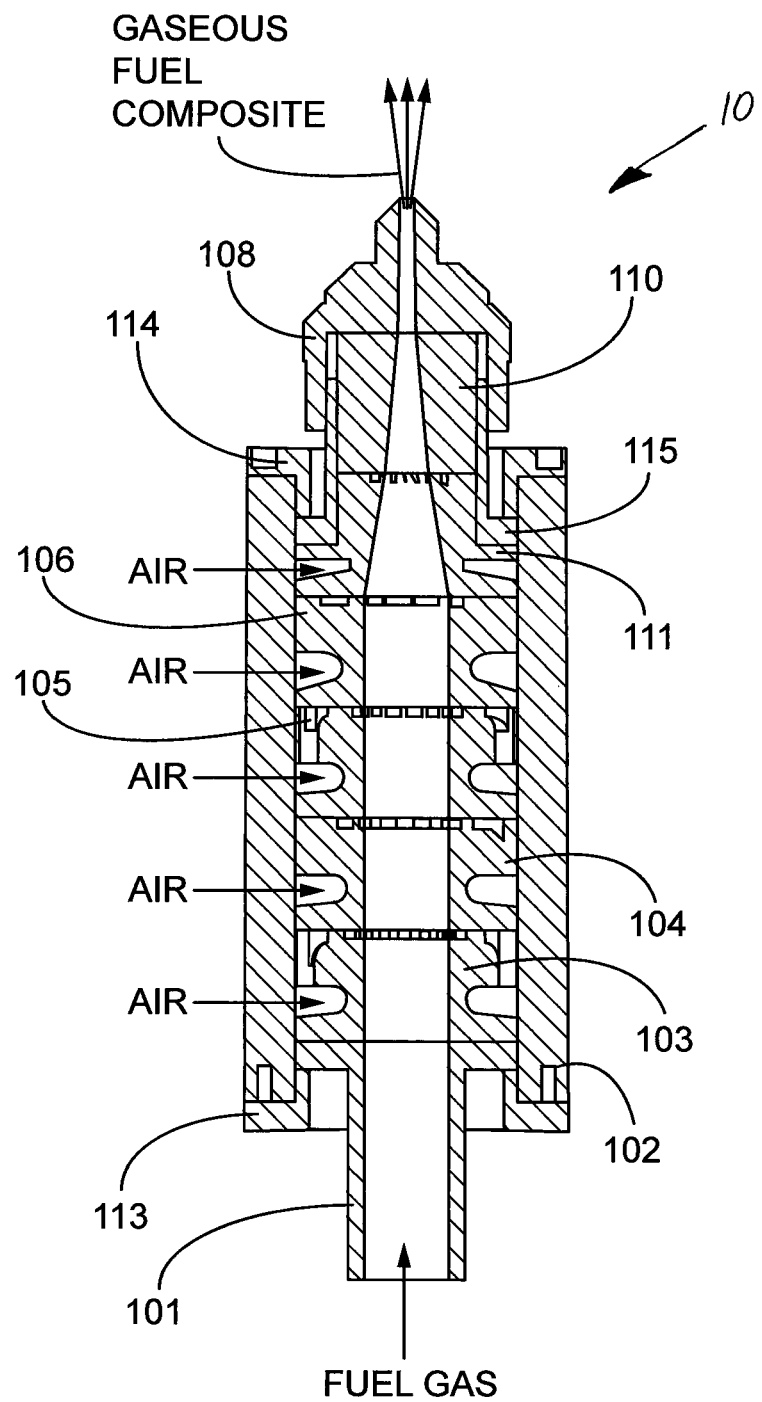
FIG. 1A is a cross-section of a device for producing a fuel composite from a fuel gas according to an embodiment of the present disclosure.

A device for the production of a gaseous fuel composite 10 is shown in FIGS. 1, 2, and 11-15. The different views and embodiments show different possible vortex generators 20 that are described and shown with greater detail in FIGS. 3-10 and 16-19. The system centers on the passage of a fuel gas 112 shown at the bottom of FIG. 1 inside of an axial chamber formed in one example by stacking a plurality of vortex generators 103, 104, 105, 106, and 107, each having an axial opening for the passage from one end shown as area 1 in FIG. 1 to the other end shown as area 7 such as a nozzle 108 or another connector pipe (not shown). The axial opening as shown in FIG. 1A has a constant section until it enters a vortex generator as shown in FIGS. 16-19.

As the section of the axial opening is reduced, either the speed of the gaseous fuel composite is increased, the density of the gaseous fuel composite is increased, or a combination of both based on upstream conditions. The device 10 as shown includes an upper flange 114 and a lower flange 113 connected hermetically with a housing 102 as shown in the shape of a cylinder with inlets for an external oxidant gas. FIG. 1A shows how multiple sources of air may enter the housing into the ring channels structure also shown in FIG. 2. The air 201, 202, 203, 204, and 205 enters the ring channels and moves upward into transit apertures leading up to tangential channels until the air is released in the axial chamber as shown by 206, 207, 208, 209, and 240, respectively.

Figure 2:
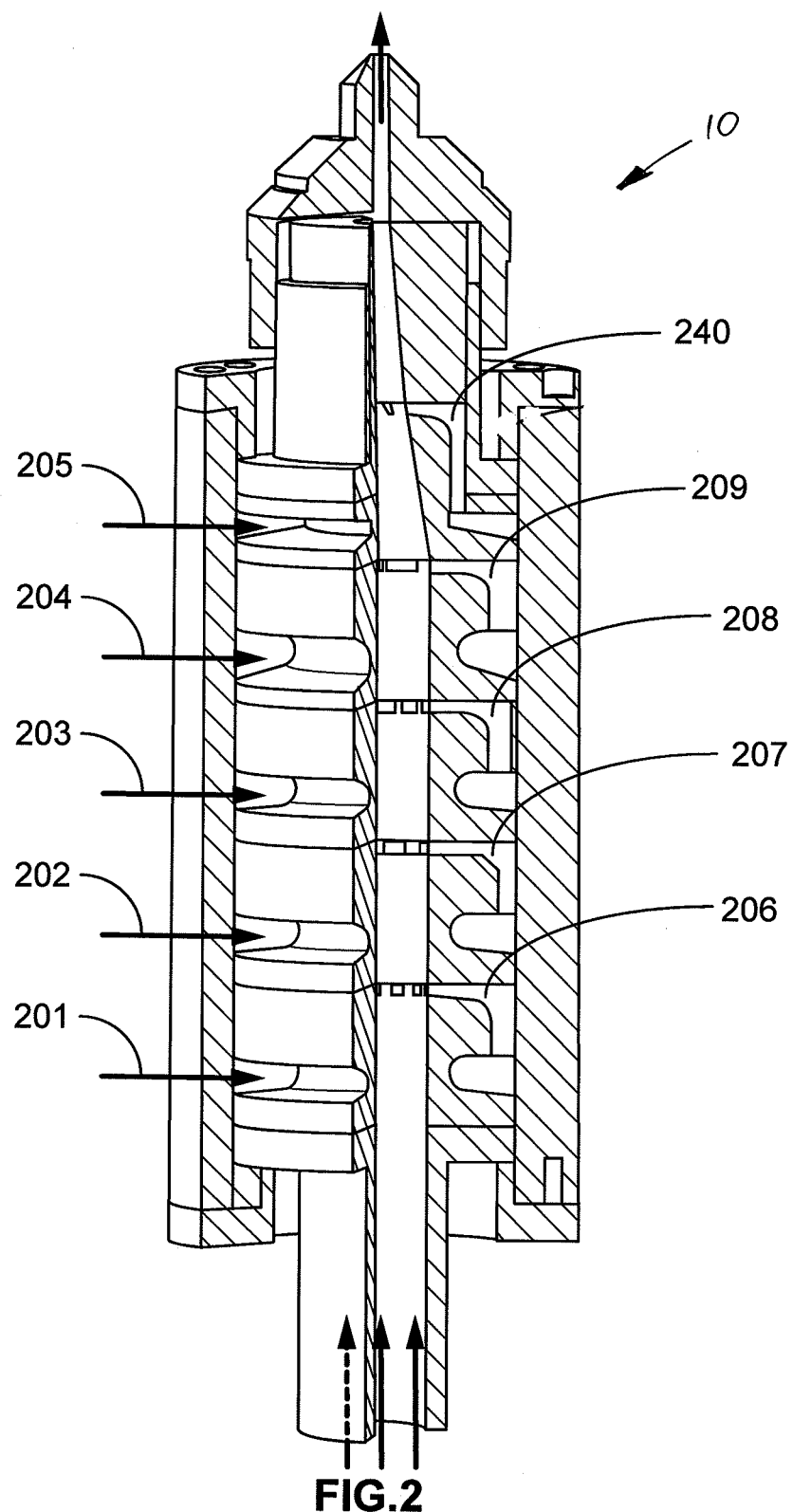
FIG. 2 is a partially cut view of the device of FIG. 1 where the external housing is opened at approximately 120° and where approximately 90° is removed from the generators for better illustration.

The multistage process shown in FIGS. 1 and 2 where air enters ring channels using a plurality of stacked vortex generators 20 allows for the creating of a gaseous fuel composite in a multistep acceleration process. In this example, five air sources are used, each entering the five ring channels of the vortex generators at areas 2, 3, 4, 5, and 6 as shown in FIG. 1. For example, if the flow of air is constant at the five sources 201, 202, 203, 204, and 205 and represents a fixed fraction of the flow of gas 112 into the device 10, then at the interface between areas 2 and 3 in FIG. 1, the gas is merged with a first portion of air to create the first stage of the gaseous fluid composite. At the interface between area 3 and 4, the already partly aerated gas is further diluted by air, and so on in each successive stage. As the air enters into an area of constant volume, the pressure, density, and speed of the gaseous fuel composite increase. At the nozzle 108, the final stage of the gaseous fuel composite is formed, which exits at 109 as a mixture of air from all of the sources and the gas fuel 112.

Figure 1C:
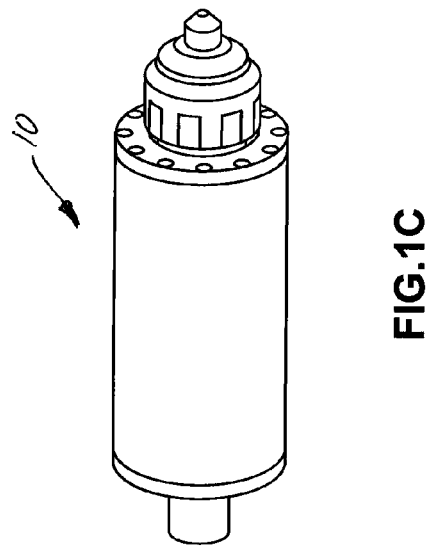
FIG. 1C is an isometric representation of the device of FIG. 1.
Figure 1B:
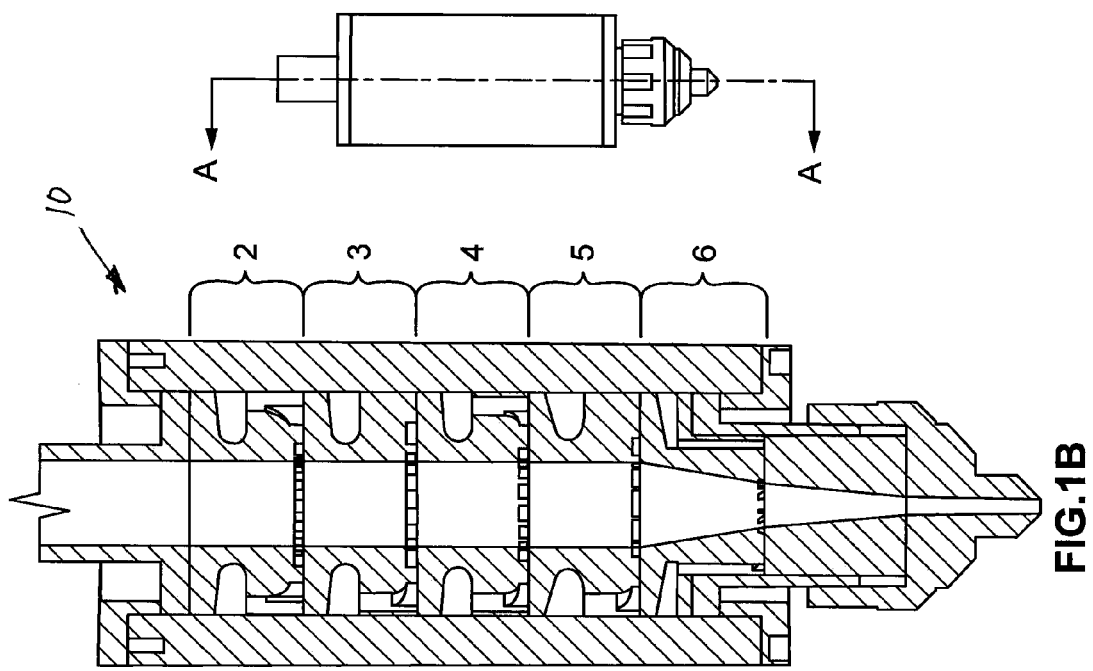
FIG. 1B is a plan view of the device of FIG. 1C as shown along cut line A-A illustrating the five generator rings.
Figure 1D:
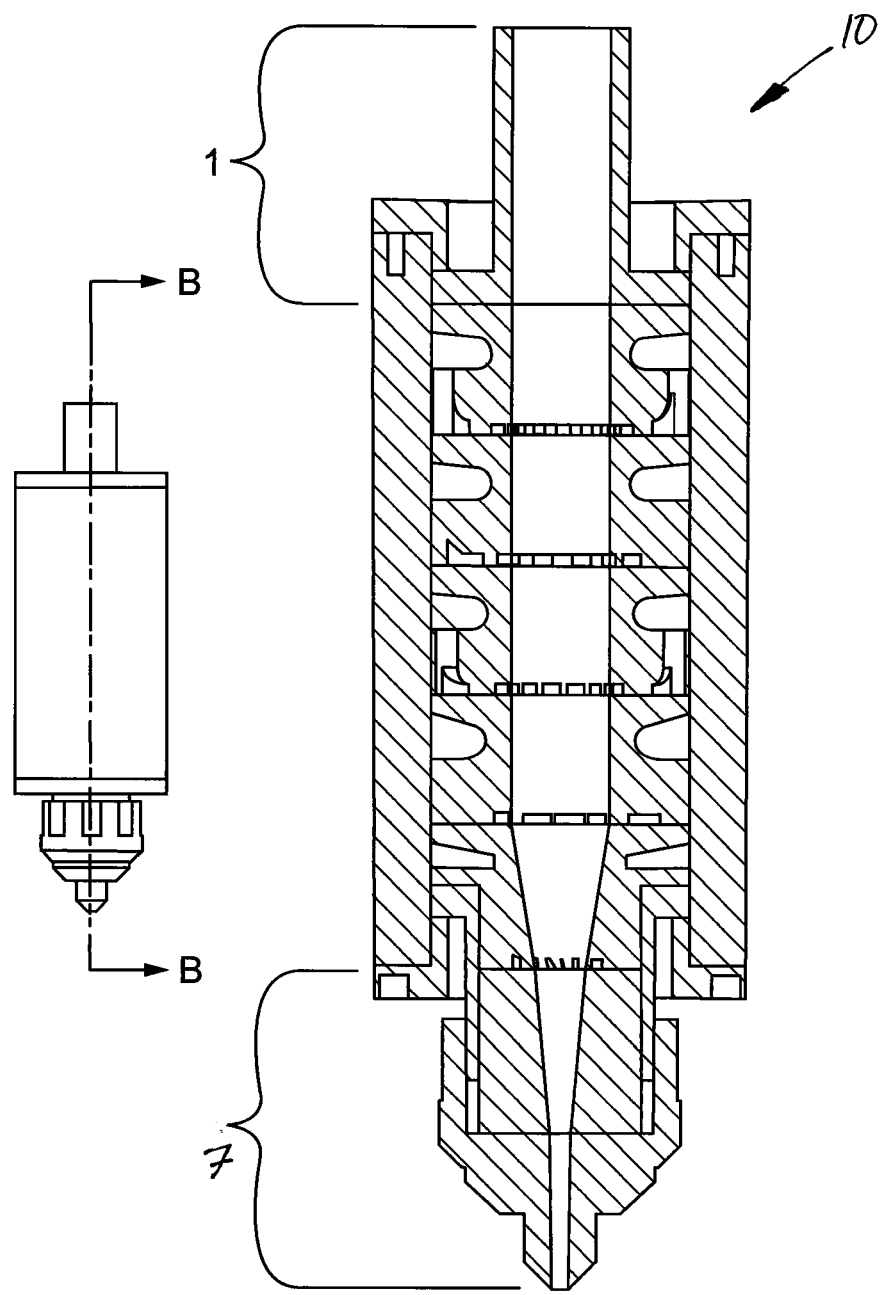
FIG. 1D is a plan view of the device of FIG. 1C as shown along cut line B-B illustrating the input and output zones.

Air is not mixed in the multistage process to produce a gaseous fluid composite simply by releasing air into the internal cavity. FIG. 1B shows in a plan view how within a single device as shown in FIG. 1C the multiple vortex generators are stacked in zones 2, 3, 4, 5, and 6. The device 10 as shown is compact and serves as a device that can be used to replace conventional nozzles. FIG. 1D shows two possible inlet and outlet interfaces 1 and 7, respectively, as part of the device 10.

Figure 3:
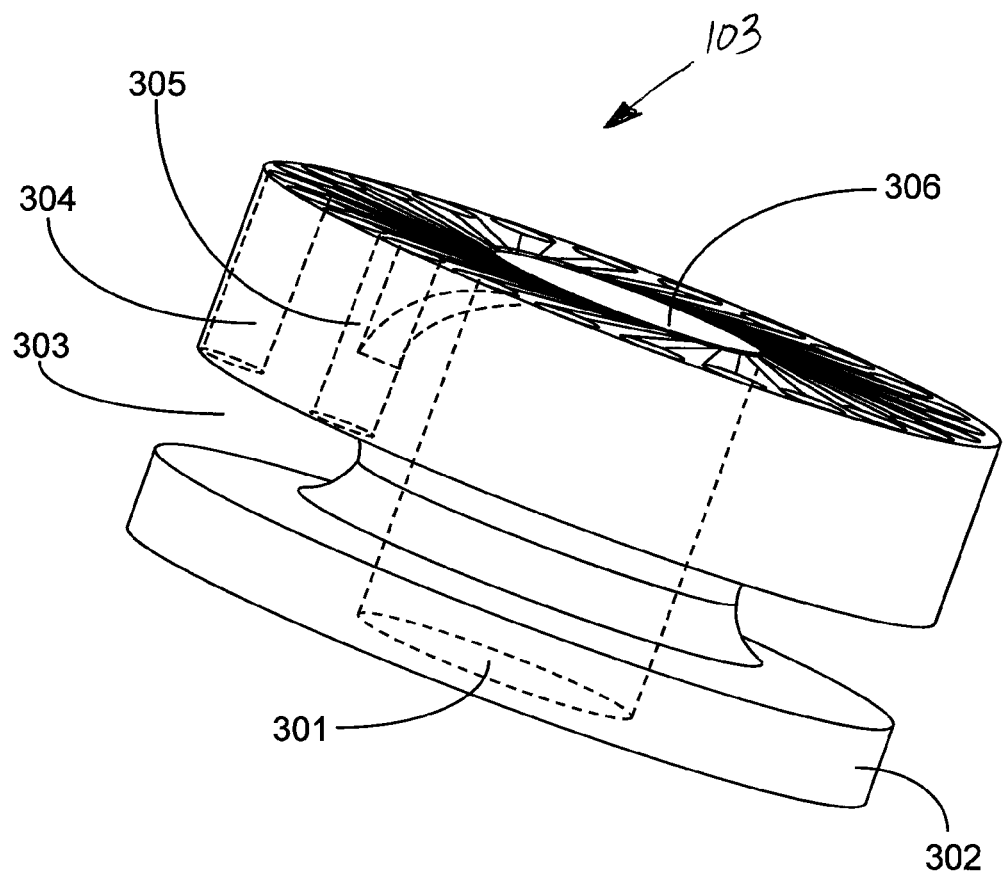
FIG. 3 is a vortex generator ring with a curved ring channel and a curved tangential channel according to an embodiment of the present disclosure.
Figure 3E:
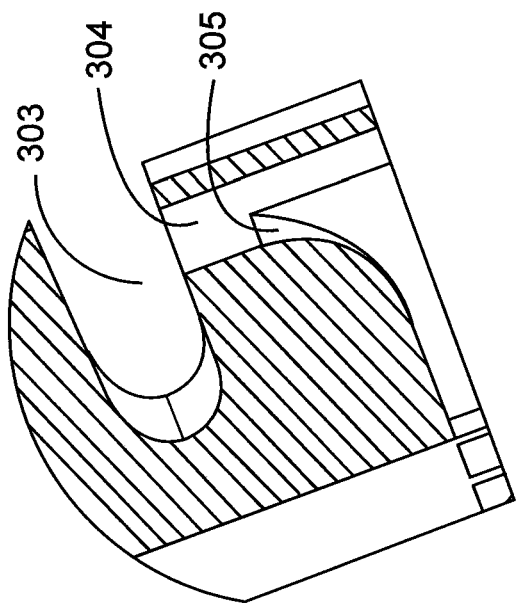
FIG. 3E is a close-up portion of the partial plan view as shown by circle D in FIG. 3D.
Figure 3D:
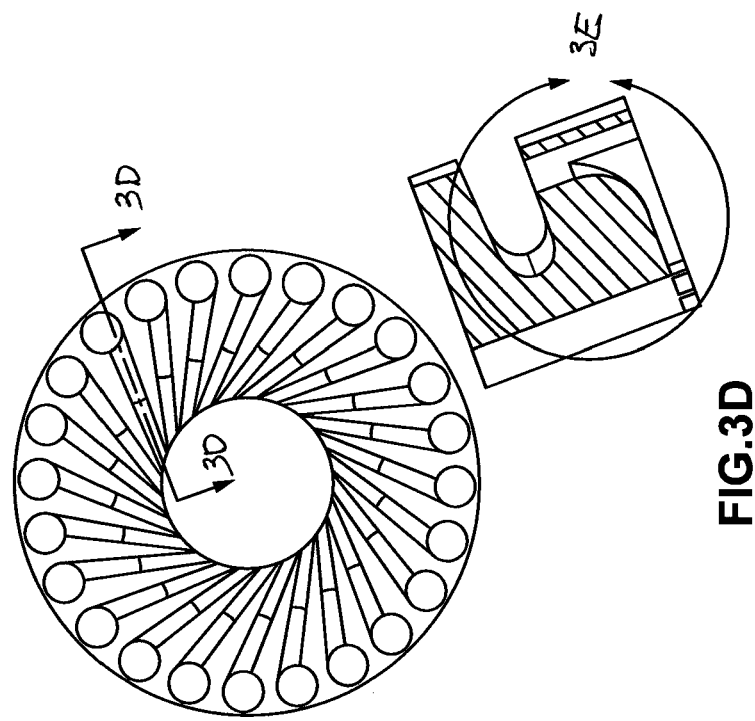
FIG. 3D is a top view and the associated partial plan view along cut line C-C of the vortex generator ring of FIG. 3.

FIG. 3 shows one vortex generator 10 where the axial channel 301 is shown in dashed lines and allows for the passage of the gas fuel and the ultimate creation of a gaseous fuel composite. A flange 302 shown with a square rim closes a channel 303 where air enters and travels upward via apertures 304 to tangential channels 306 via aerodynamic channel amplifiers 305 shown to be curved inwards to allow for the air within the channel 303 to travel upward in the apertures 304 and then to the tangential channels 306 in a 90 degree bend in an area where the flow is bent and pressure drops are observed because of the change in direction at the bend. FIGS. 3A-3C illustrate the vortex generator 10 of FIG. 3. FIGS. 3D and 3E show in close-up views how the air can travel upward from the channel 303 to the aperture 304 and then bend inwards over the curved aerodynamic channel amplifiers 305.

Figure 4:
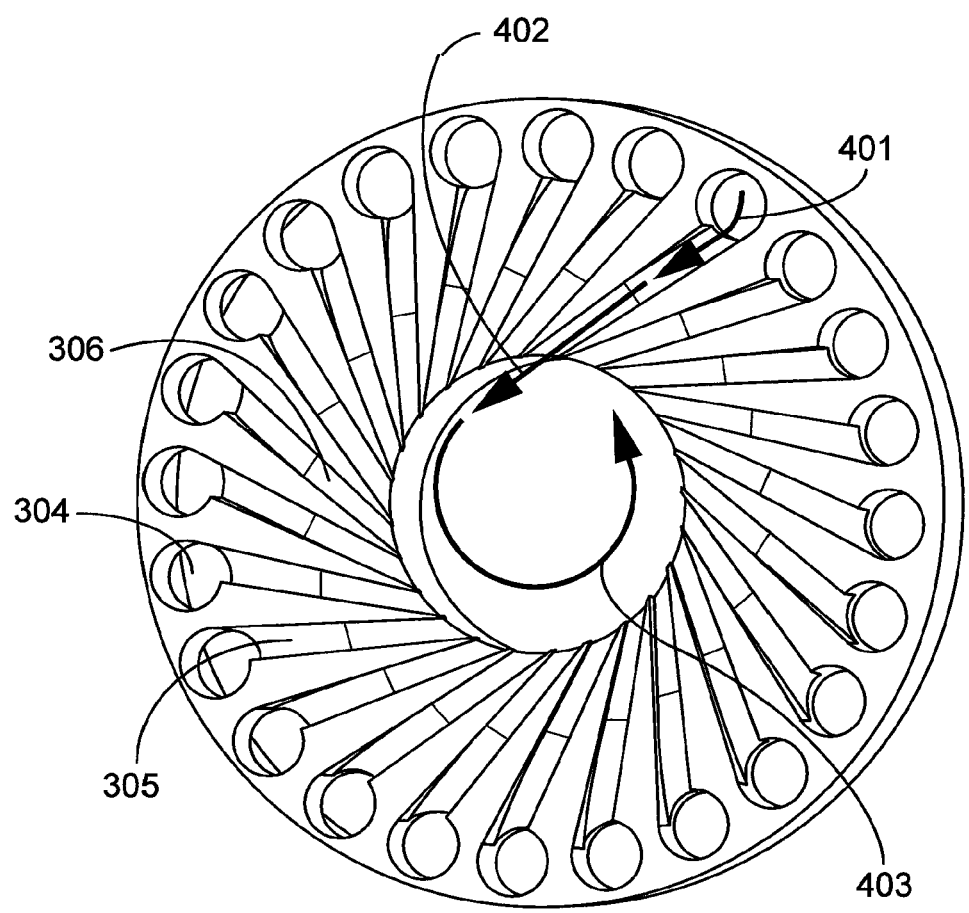
FIG. 4 is a top isometric view of a vortex generator ring illustrating the flow of gas from the ring channel to the axial channel and forming a vortex according to an embodiment of the present disclosure.

Using a dark arrow, FIG. 4 shows how the air moves around and out of the aperture 304 as illustrated 401 and slides 402 into the tangential channel 306 around a curved aerodynamic channel amplifier 305 in a resulting circular motion 403. A different view of this effect is shown in FIG. 5 where air 201 moves up 502 and slides 401 over the aerodynamic channel amplifier before it is released 402 into the circular motion 403.

Figure 5:
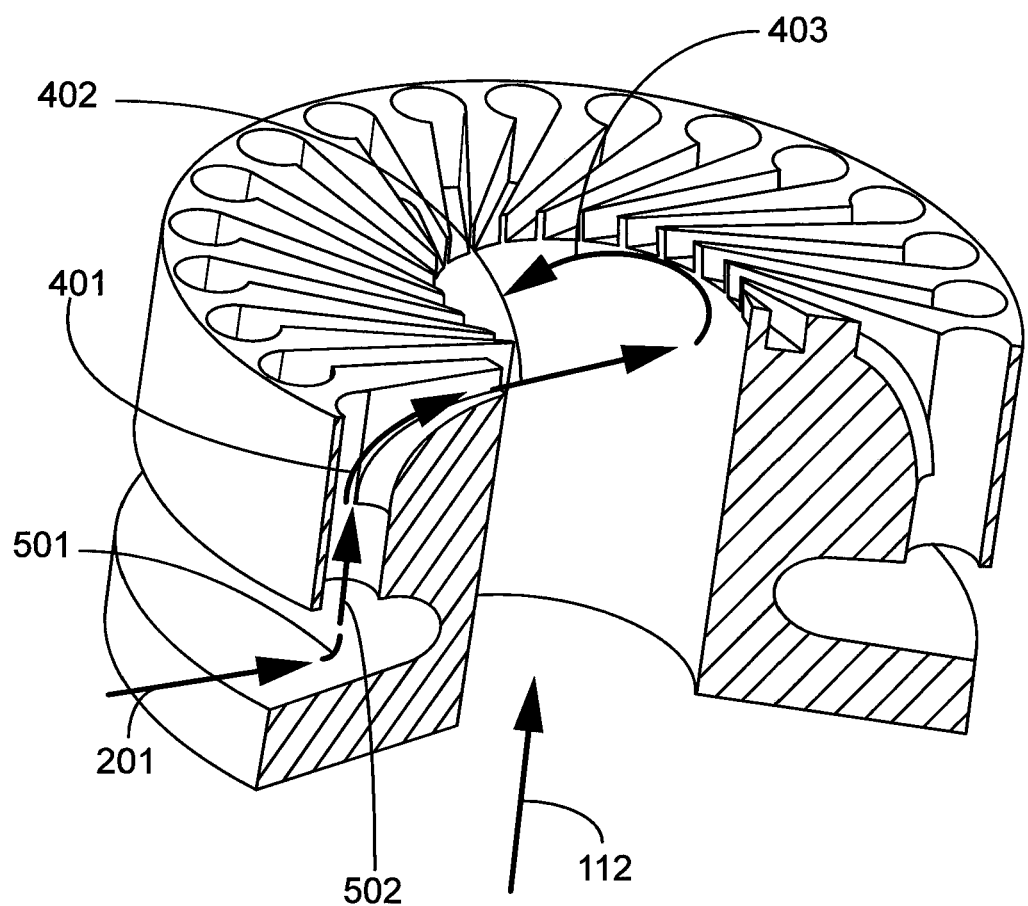
FIG. 5 is a perspective view of the vortex generator of FIG. 4 with a cut-off section to better illustrate the flow of gas from the ring channel to the axial channel.
Figure 6:
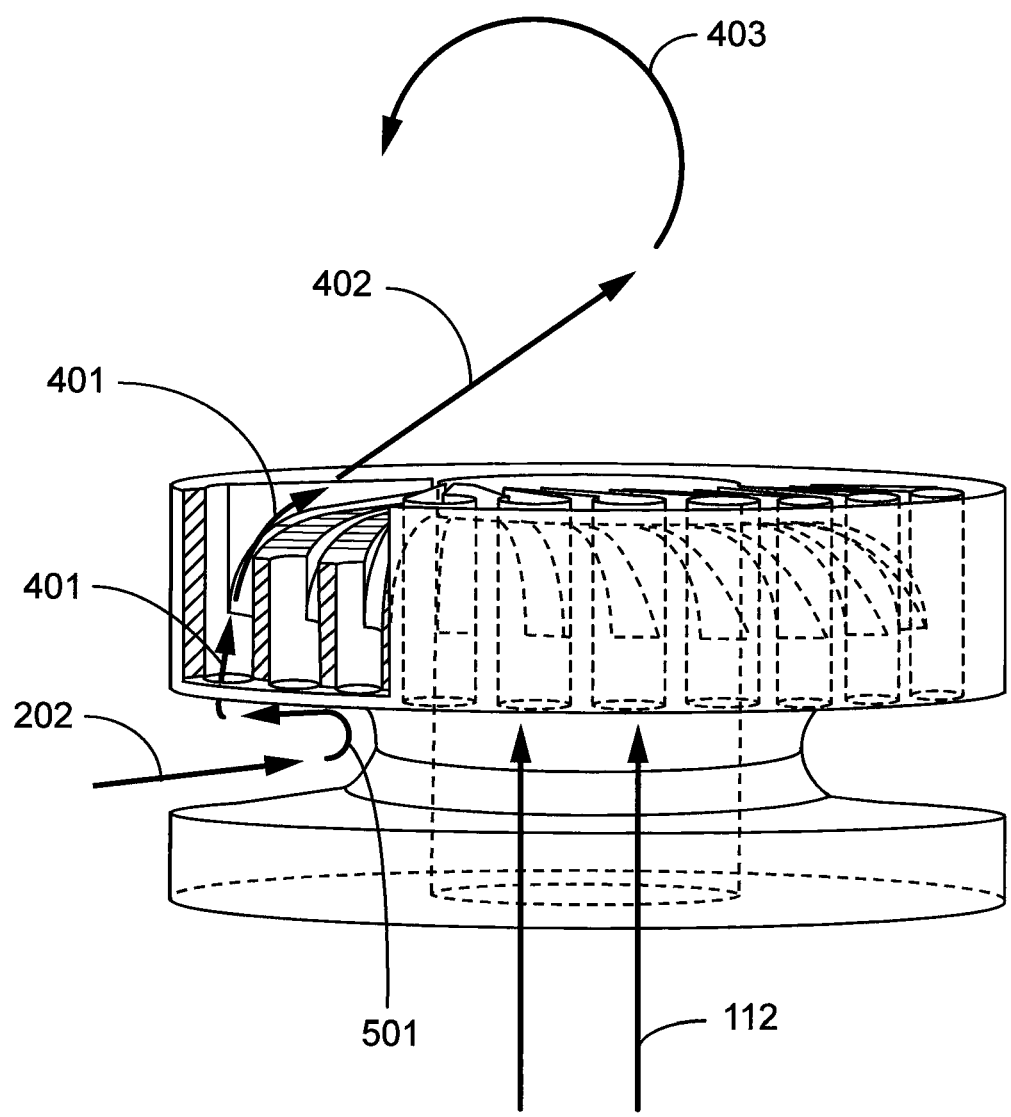
FIG. 6 is a side view of a 3D illustration of the vortex generator of FIG. 4 illustrating how the curved tangential channel creates an upward movement in the air as it enters the axial channel.

As shown in FIG. 5, the ring channel also includes an internal curve that results in a first curvature 501 of the flow before it enters the aperture. As the flow of air travels over the curved aerodynamic channel amplifier and slides 401, the molecules of air have an upward portion of kinetic energy that remains in the air upon release 402 into the cavity for the circular motion 403. Since the incoming gas fuel 112 has also an upward movement, the upward portion of the kinetic energy is conserved and amplifies the upward movement of the gaseous fuel composite. FIGS. 6A-6C illustrate alternative views of the vortex generator 20 of FIG. 6.

Figure 7:
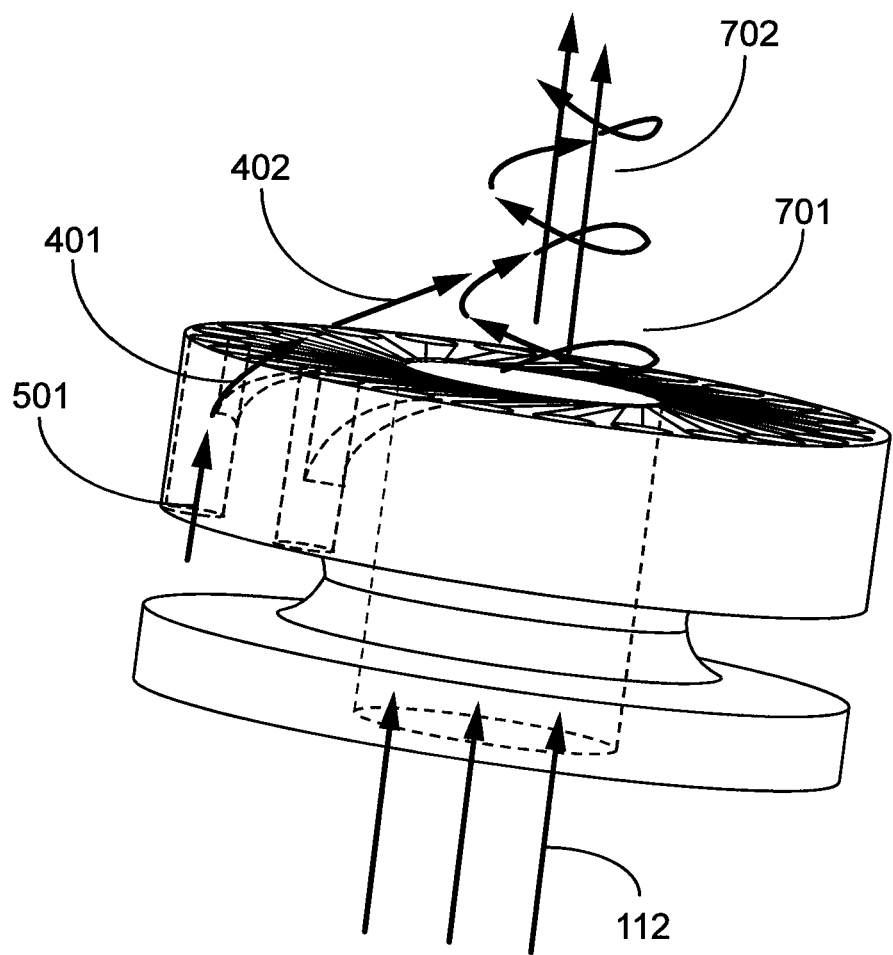
FIG. 7 is the side view of FIG. 6 illustrating how the upward movement in the air mixes in with the flow of the gas fuel in the axial channel.
Figure 8:
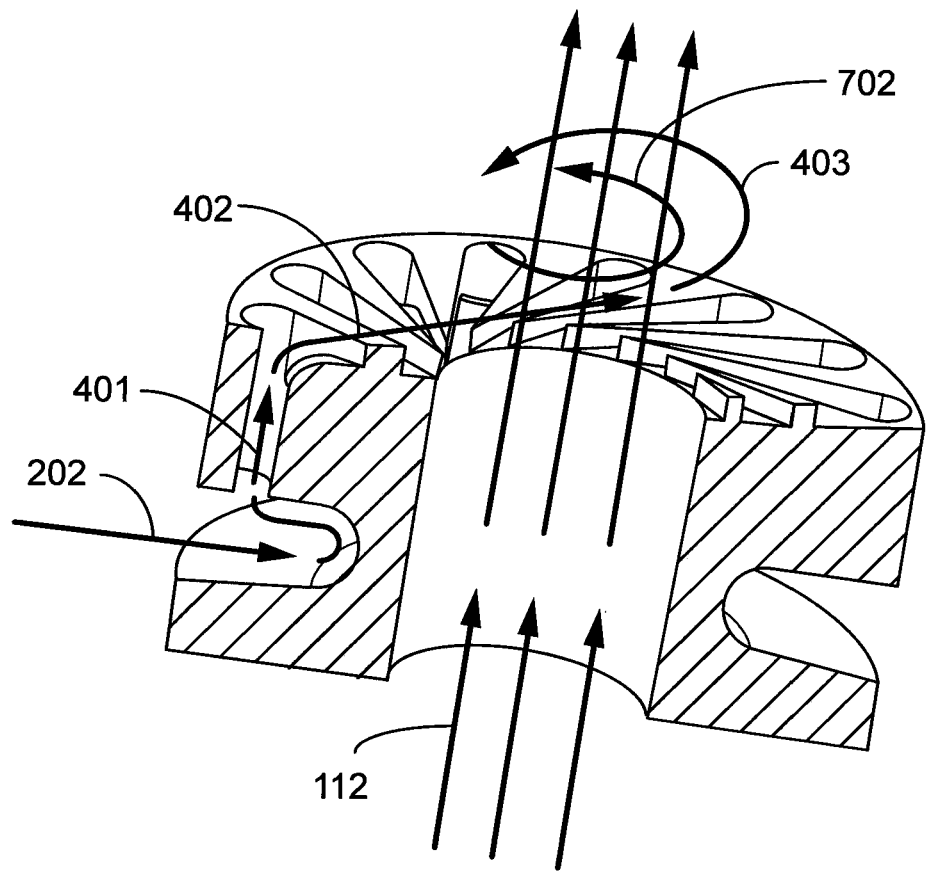
FIG. 8 is a median cross-cut view of the vortex generator as shown in FIG. 7 illustrating the upward movement of the oxidant gas within the fuel gas in the axial channel.
Figure 9:
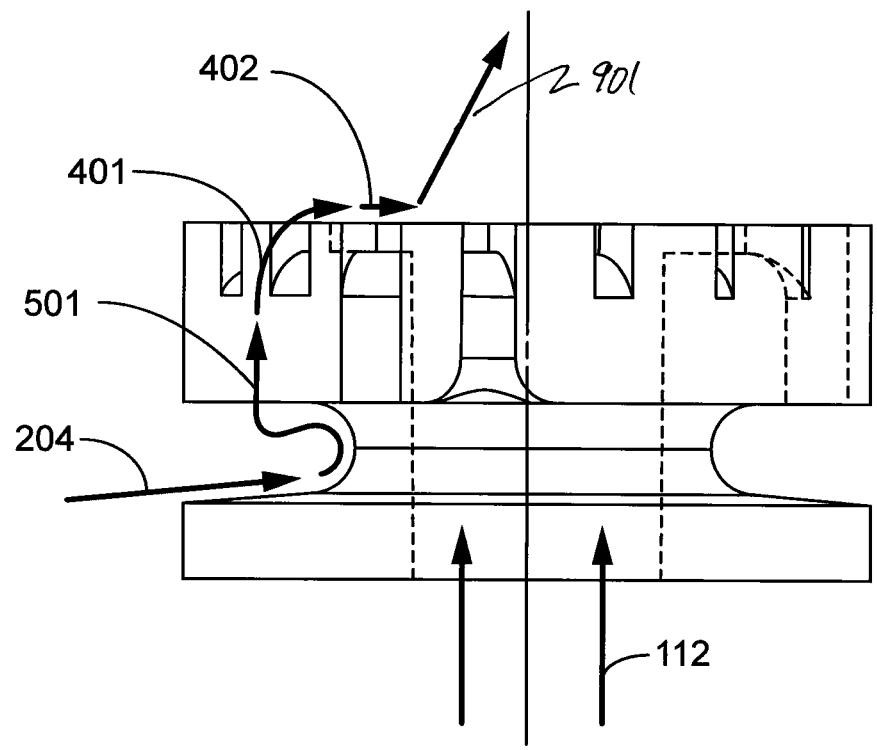
FIG. 9 is a side view of the vortex generator of FIG. 7 illustrating the upward movement of the oxidant gas in the fuel gas.
Figure 9C:
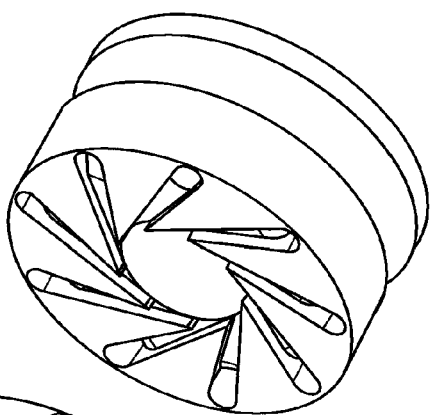
FIG. 9C is a series of two isometric views at different orientations of the vortex generator ring of FIG. 9.
Figure 9A:
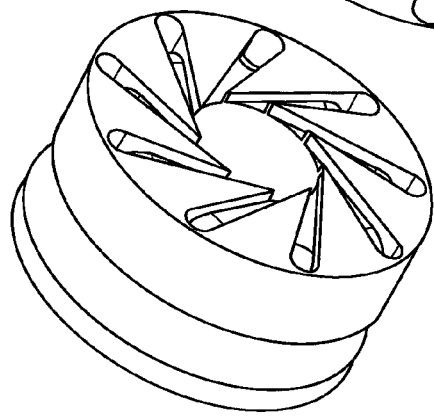
FIG. 9A s a top view of the vortex generator ring of FIG. 9.
Figure 9A:
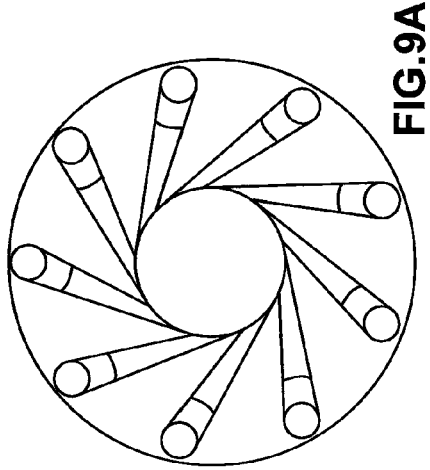
Figure 9B:
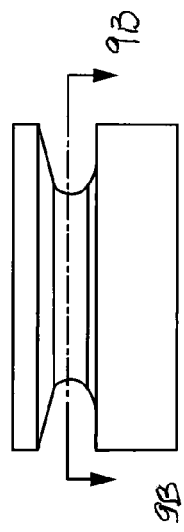
FIG. 9B is a cut view taken along cut line A-A illustrating the curved ring channel.
Figure 9B:
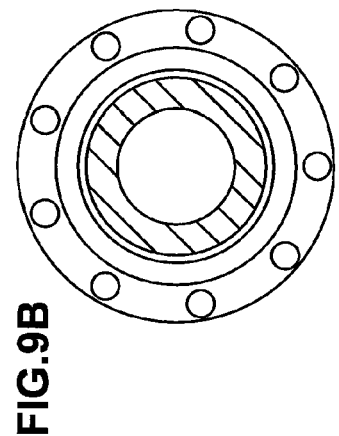
Figure 10:
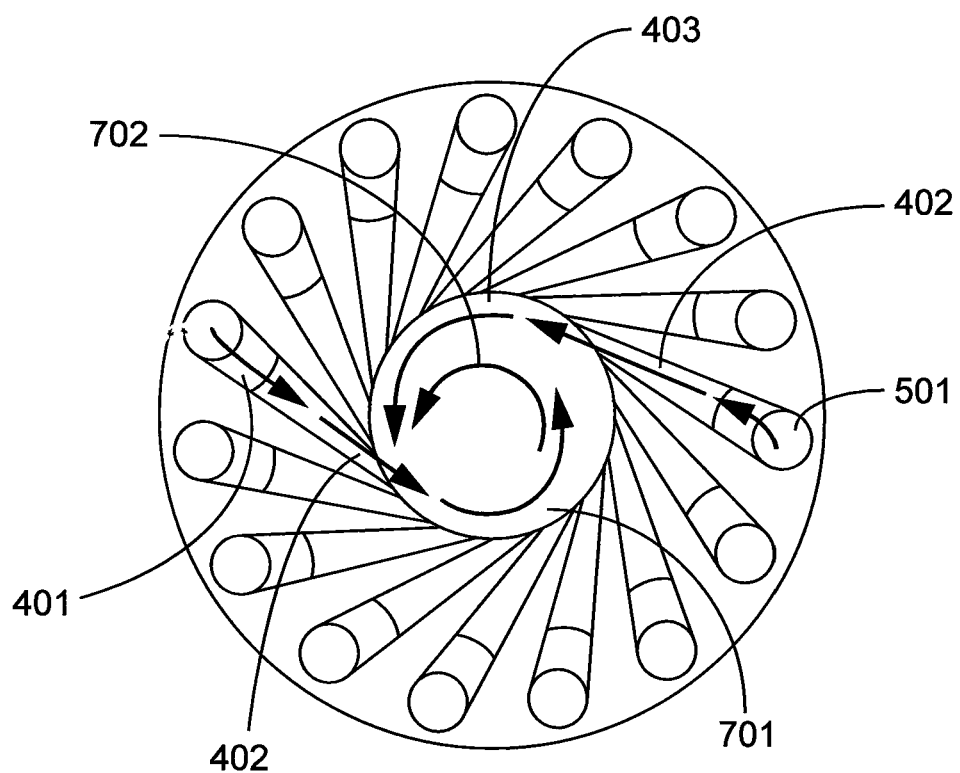
FIG. 10 is a top view of the vortex generator of FIG. 9 illustrating the perpendicular flow of oxidant gas along the tangential channels.

As the tangential channels create a vortex-like movement of the air as it enters the vertical cavity and mixes with the gas fuel 112 it has two vector components: a rotational energy that creates a rotational movement of the gaseous fuel composite and an upward energy that lifts the gaseous fuel composite and increases the speed and energy of the overall gaseous fuel composite. When both of these vectors are merged with the upward movement of the gaseous fuel composite, the resulting upward vortex 701 and 702 is created. FIGS. 7A and 7B illustrate alternative views of the vortex generator 20 of FIG. 7. FIGS. 8 and 9 are different views of the vortex generator 20 of FIG. 7, which illustrates the dynamic flow created by the generator 20 within the gas fuel 112. FIGS. 9A-9C illustrate alternative views of the vortex generator 20 of FIG. 9. Element 901 of FIG. 9 illustrates the upward vertical kinetic energy of the air after it is released within the gas fuel 112.

Figure 11:
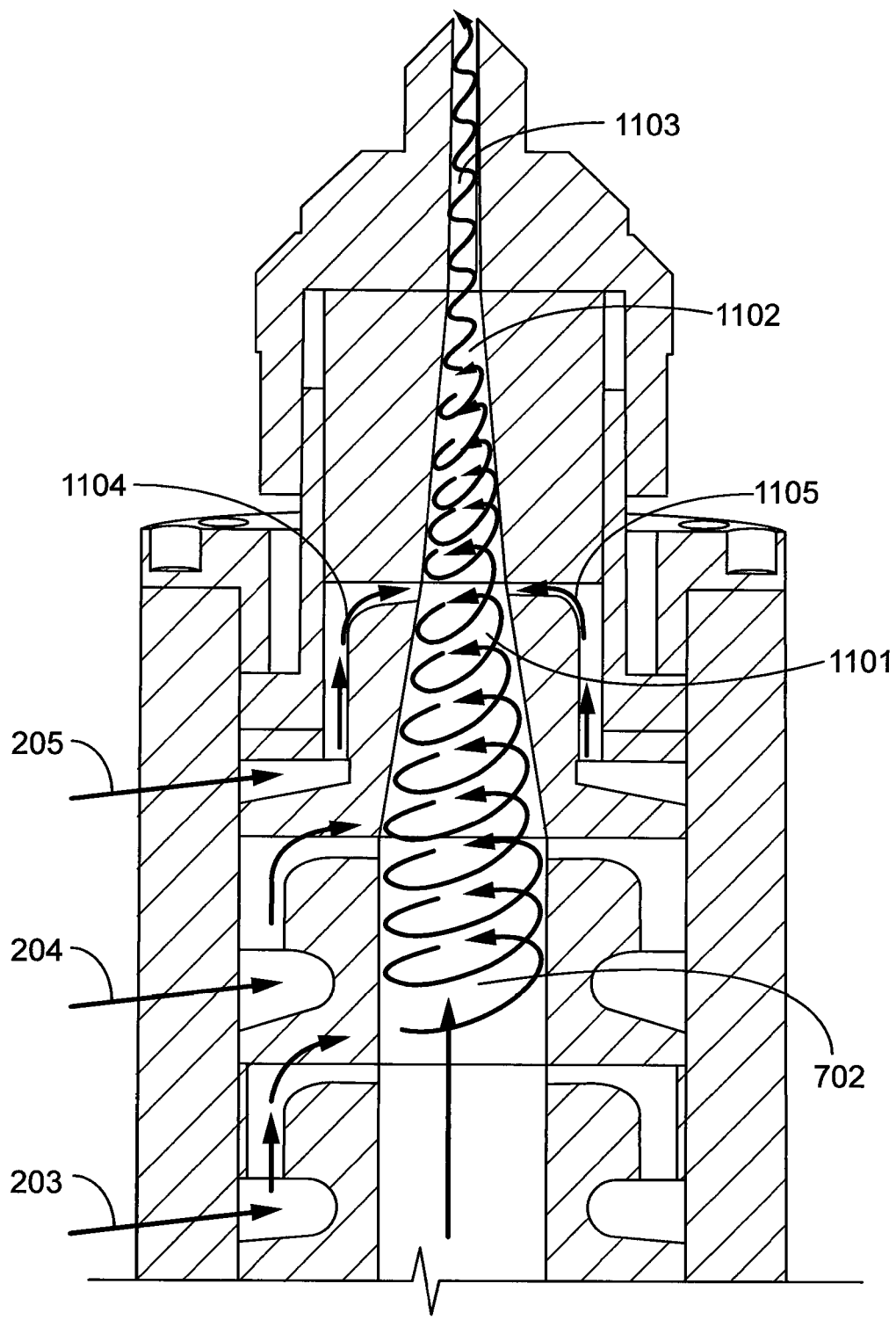
FIG. 11 is a plan view of the device of FIG. 1 illustrating the compression and formation of the gaseous fuel composite at the nozzle according to an embodiment of the present disclosure.
Figure 12:
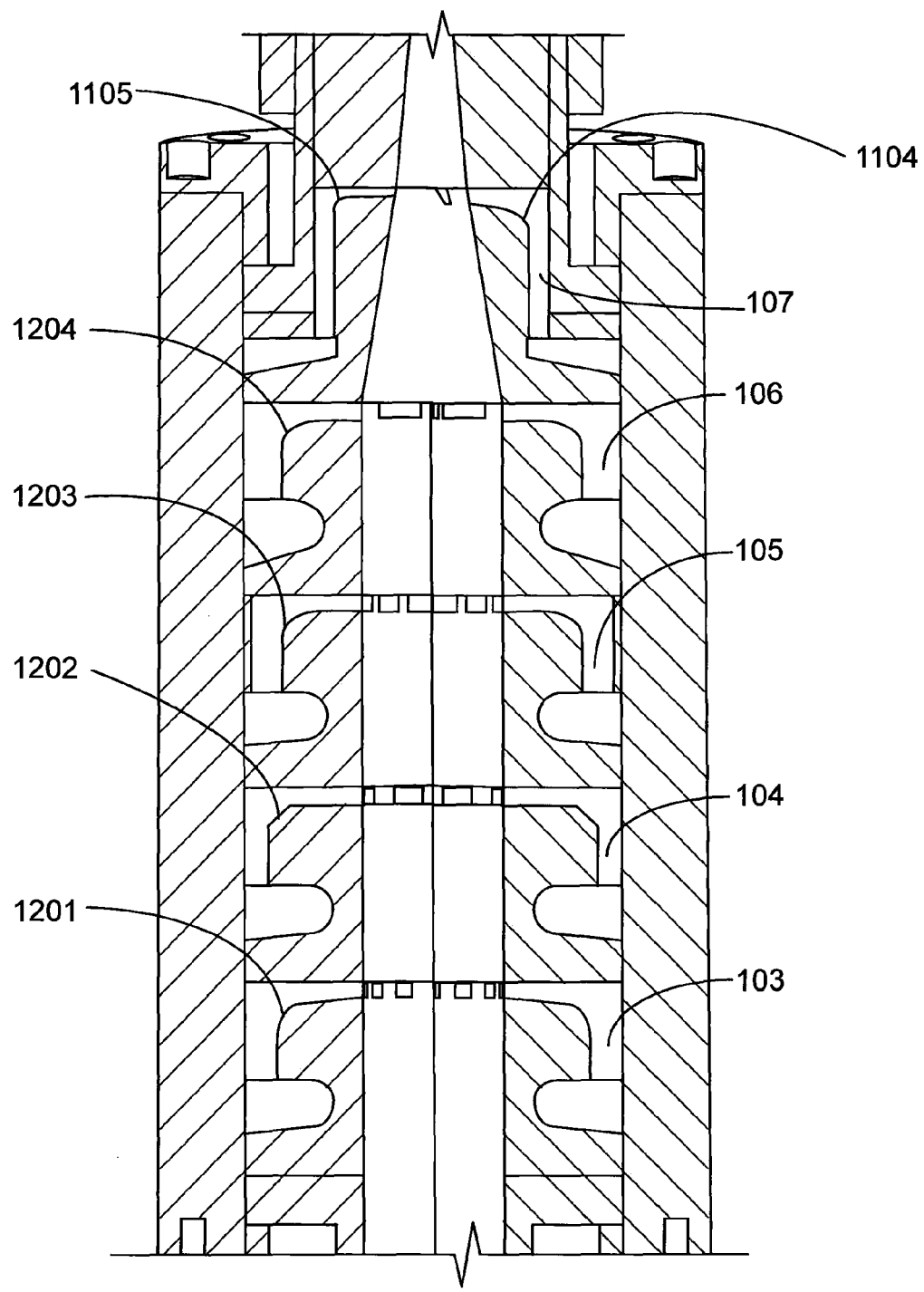
FIG. 12 is a plan view of a portion of the device of FIG. 1 where several vortex generators are stacked each with different configurations according to another embodiment of the present disclosure.
Figure 13:
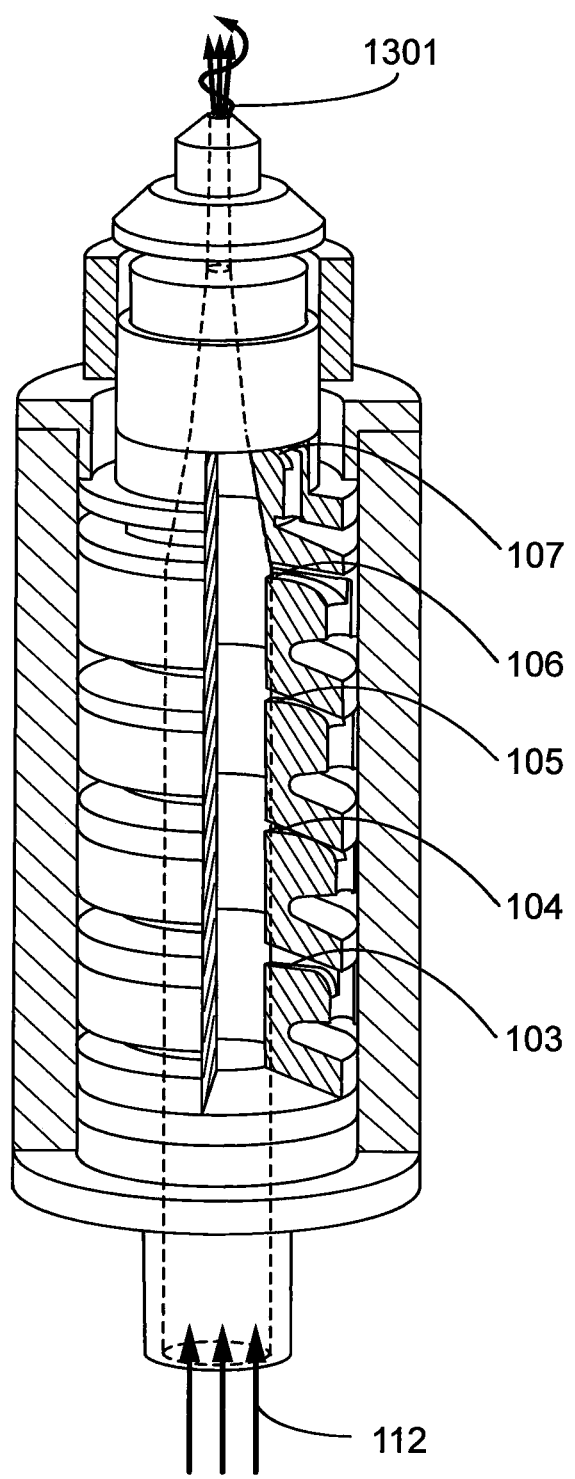
FIG. 13 is a partially cut view of the device of FIG. 12 illustrating the device of FIG. 1 where several different vortex generators are stacked linearly in the device.
Figure 14:
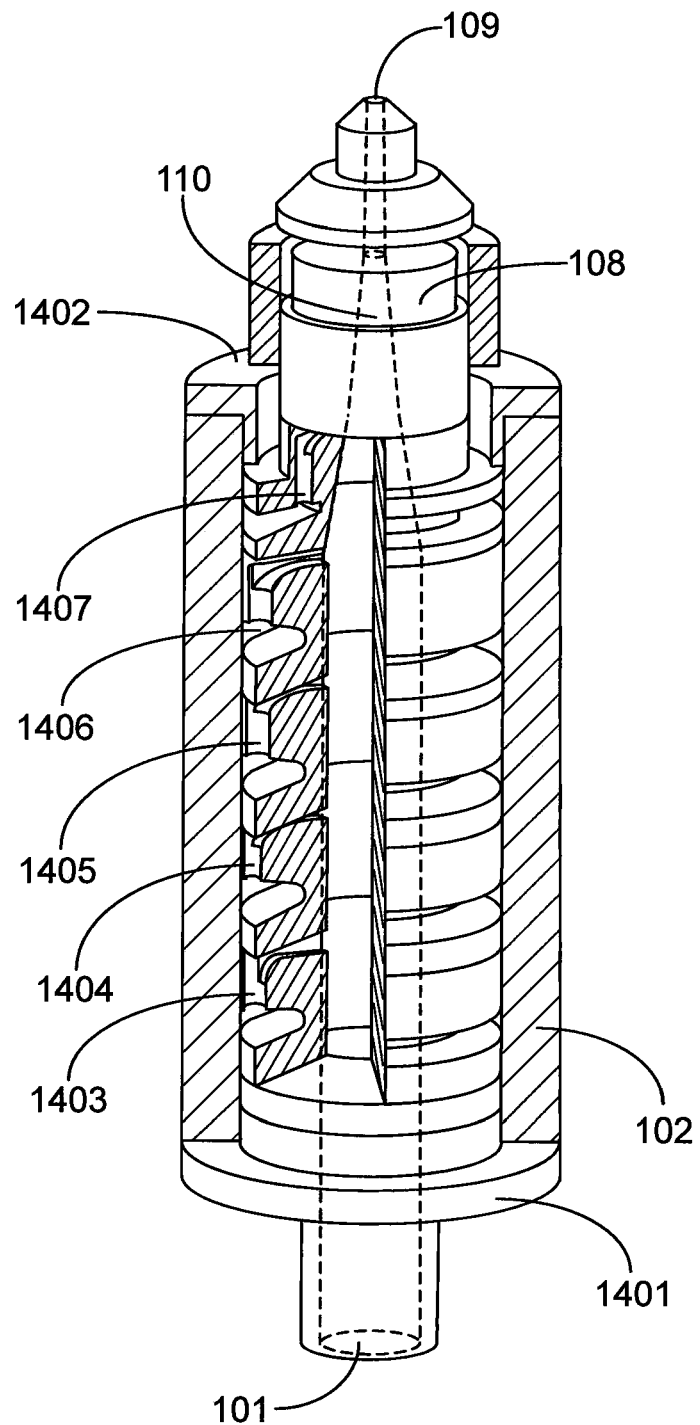
FIG. 14 is a partially cut view of the device of FIG. 12 illustrating a different removed portion than in FIG. 13.
Figure 15:
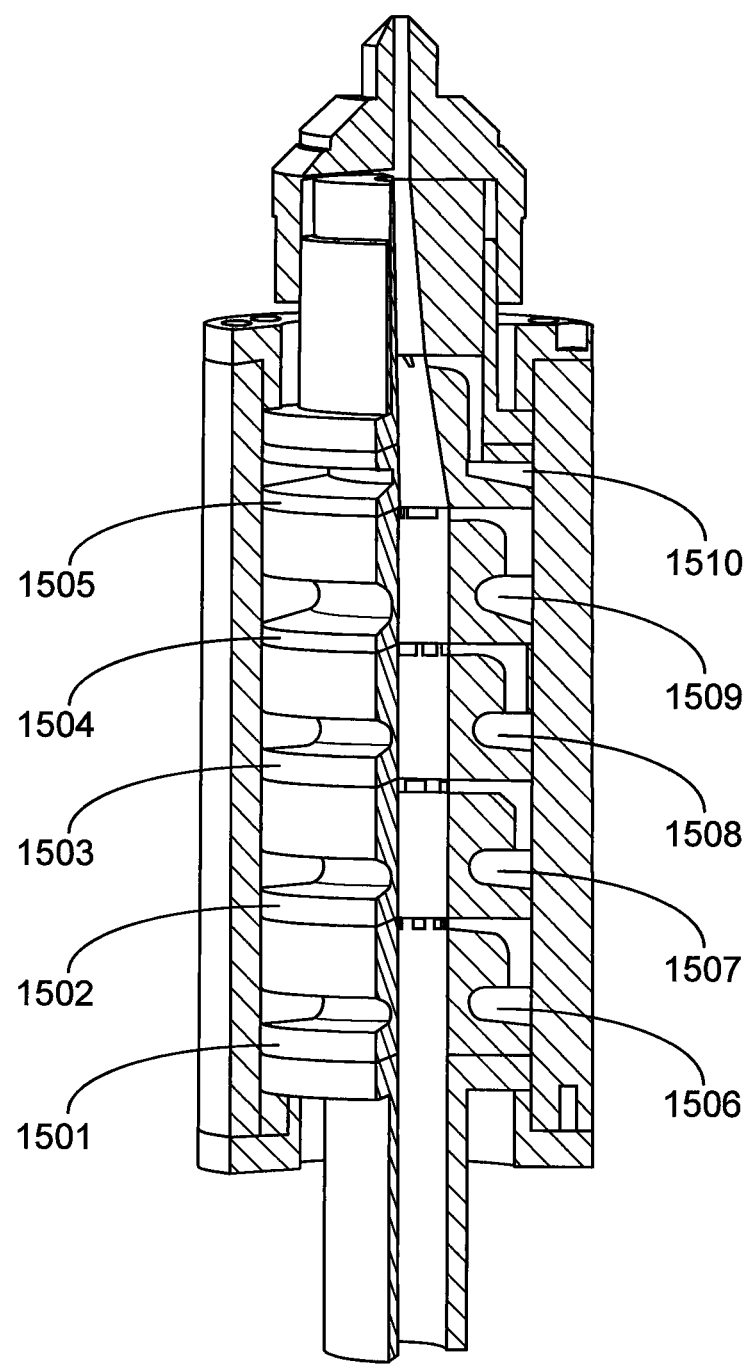
FIG. 15 is a side view of a three-dimensional partly cut view of the device of FIG. 12 illustrating the different channels.

Using arrows, FIG. 11 shows how the gaseous composite goes from a first stage 702 upwards in one or two stages 1101 and 1101 where the axial channel is conical and results in the compression of the highly energized gas mixture in a nozzle 1103. As shown in FIG. 12, not all aerodynamic channel amplifiers can be curved or bent with the same radius. Because of the way the plan view is cut in a vortex generator 20 having a good number of apertures and associated tangential channels and aerodynamic channel amplifiers, these appear as different configurations 1201, 1202, 1203, 1204, and 1105. In one embodiment, the dimensions of the apertures and channels are the same across all vortex generators within a device 10, and in other embodiments, the flow of air and the dimensions of apertures and channels differ from one vortex generator to the next to help regulate a multistep process. FIGS. 13-15 are different views of the device 10 illustrating how configurations of the vortex generators 103, 104, 105, 106, and 107, can differ 1403, 1404, 1405, 1406, and 1407, and 1501, 1502, 1503, 1504, and 1505, respectively. Associated ring channels 1506, 1507, 1508, 1509, and 1510 are also shown in FIG. 15.

Figure 16:
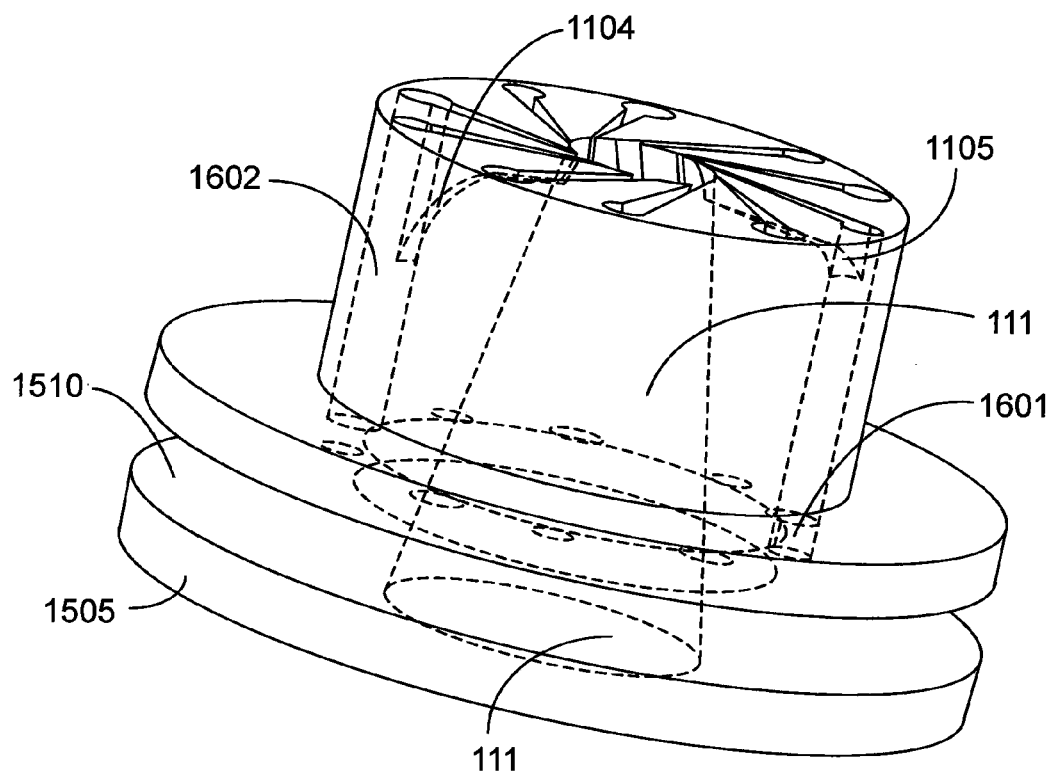
FIG. 16 is a three-dimensional view with dashed lines of the different portions of the top vortex generator placed next to the nozzle of the device of FIG. 12 according to an embodiment of the present disclosure.
Figure 16C:
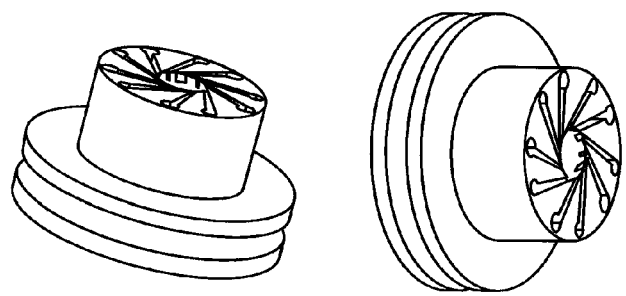
FIG. 16C is a series of two isometric views at different orientations of the vortex generator ring of FIG. 16.
Figure 16A:
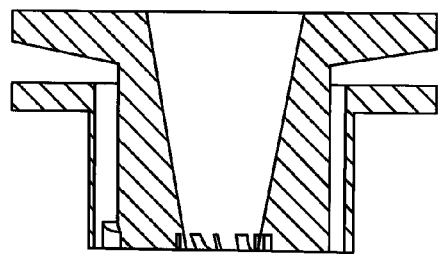
FIG. 16A is a top view of the vortex generator ring of FIG. 16.
Figure 16B:
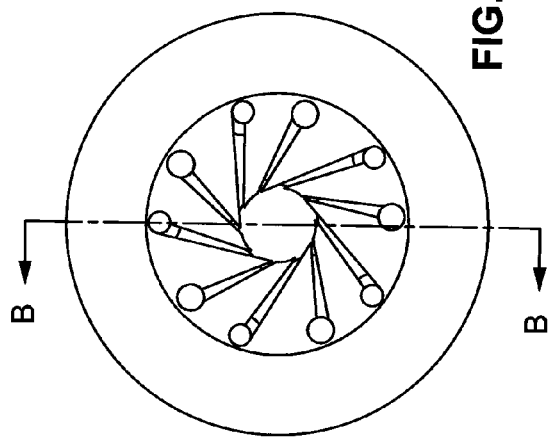
FIG. 16B is a cut view taken along cut line A-A illustrating the tangential channels.
Figure 16B:
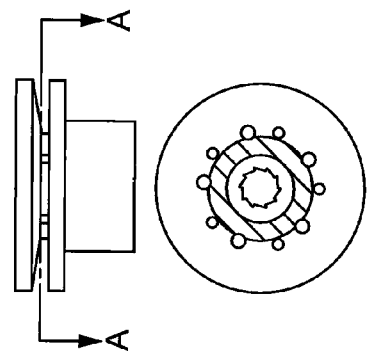
Figure 17:
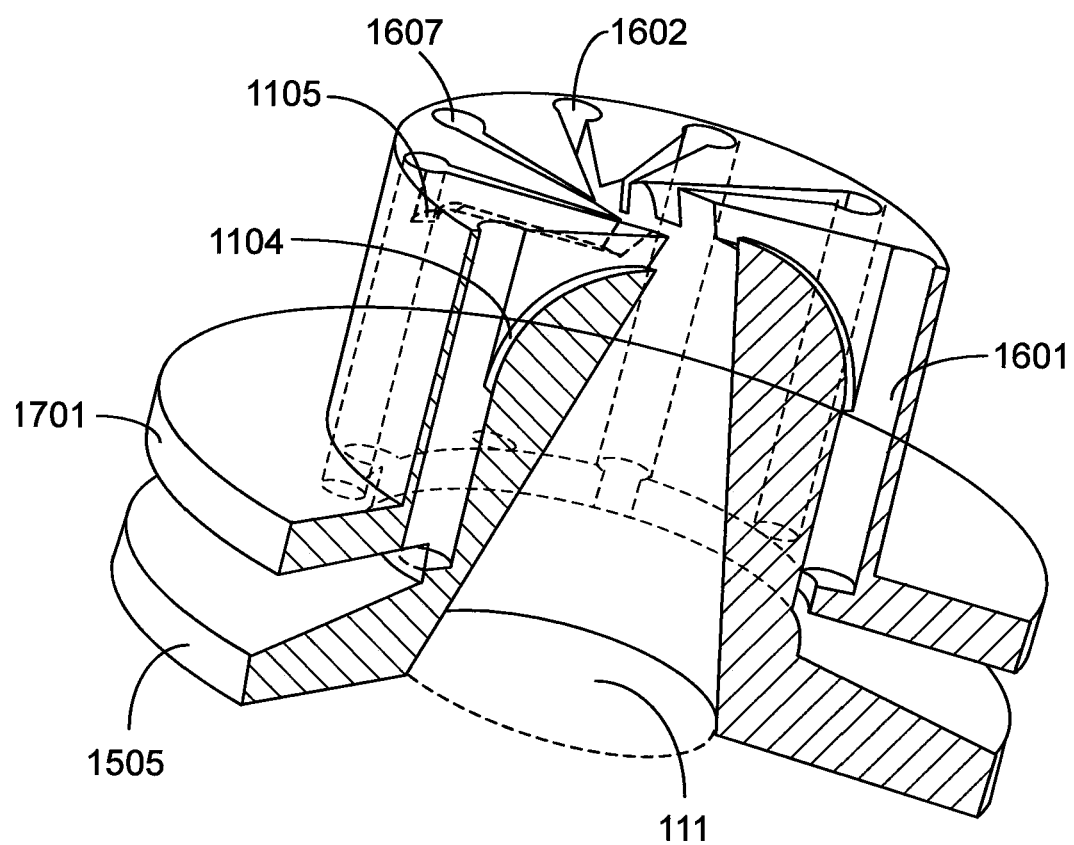
FIG. 17 is a partly cut away view of the vortex generator of FIG. 16 with an internal conical portion as part of the axial channel.
Figure 18:
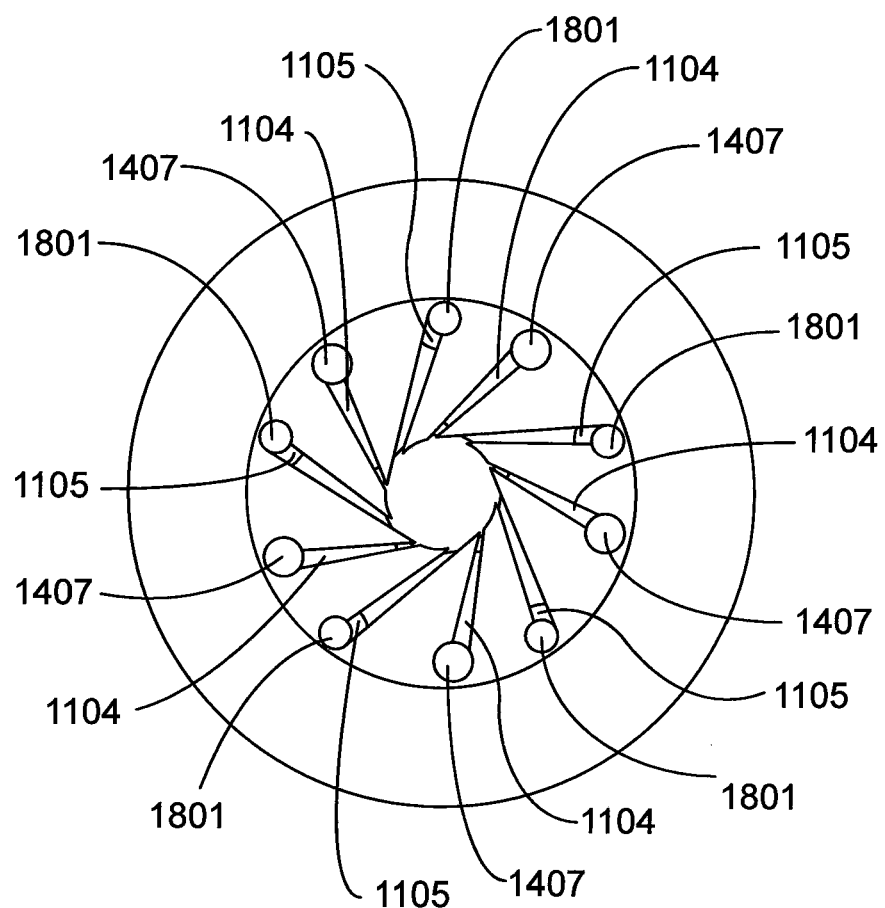
FIG. 18 is a top view of the vortex generator of FIG. 16.
Figure 19:
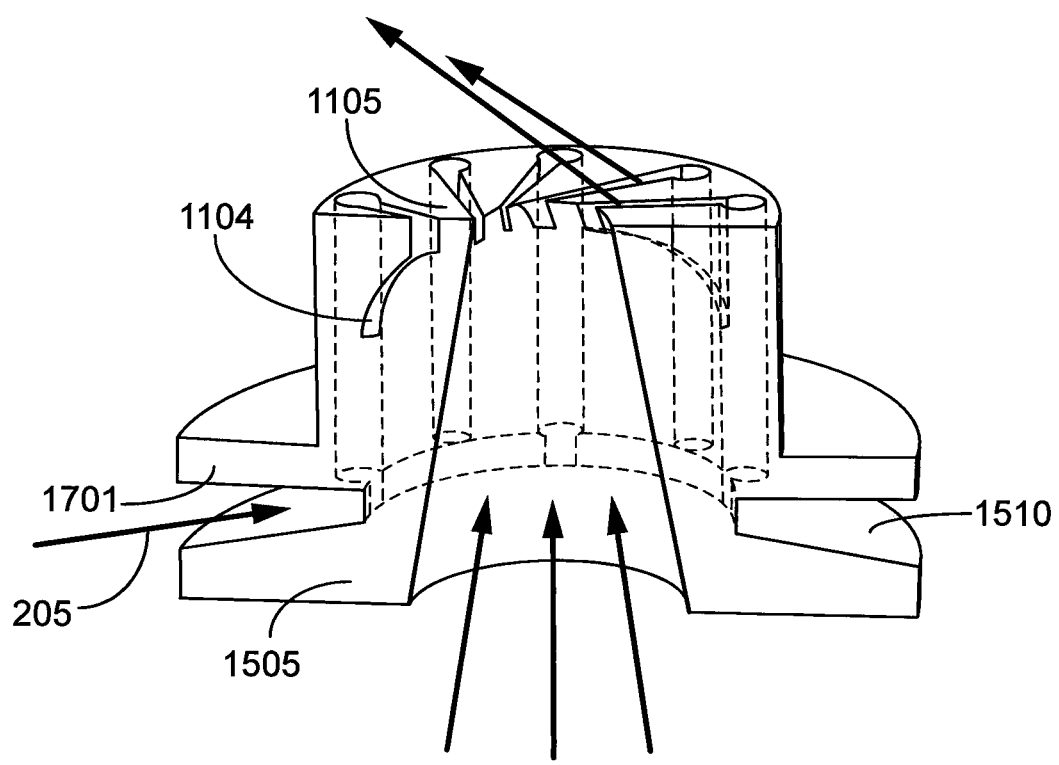
FIG. 19 is a partly cut away view of the vortex generator of FIG. 16 illustrating the different flows within the device.

FIGS. 16-19 are different illustrations of a vortex generator 1105 as shown in FIG. 12, where a conical internal axial channel is present. In this embodiment, the flange 1505 remains at the same radius as the other vortex generators, creating a ring channel 1510 for the passage of air via the apertures 1602 over the curved aerodynamic channel amplifier 1104 with a first radius or a second type of aerodynamic channel amplifier 1105 with a second radius. FIGS. 16A-16C illustrate alternative views of the vortex generator 20 of FIG. 9. FIG. 17 shows the external radius on the flange 1701 where tangential channels 1607 and apertures 1602 are located in close proximity to the reducing vertical passageway. FIG. 18 shows as 1801 how some apertures can include a first type of aerodynamic channel amplifier 1105 and how a second type of apertures 1407 can include a second type of aerodynamic channel amplifier 1104. FIG. 19 is another illustration of the vortex generator according to a different view and illustrates how the air flows outside of the tangential channels.

What is shown in FIG. 1 is a device 10 for producing a gaseous fuel composite with an inlet 101 connected a source of gas fuel 112, a housing 102 between the inlet 101 and an outlet 108 for the passage a gas fuel 112 from the inlet 102 to the outlet 108 from the source of gas fuel, and a plurality of vortex generators 103, 104, 105, 106, and 107, each with an axial channel 301 as shown in FIG. 3, the generators 103, 104, 105, 106, and 107 being in a stacked configuration in relation with the other vortex generators in the housing 102 between the inlet 101 and the outlet 108, where each of the vortex generators 103, 104, 105, 106, and 107 include a flange 302 defining a ring channel 303 in fluid connection as shown by the arrows 201, 202, 203, 204, and 205 in FIG. 2 with at least a source of air and a plurality of apertures 304 and associated tangential channels 306 for the passage of air from the ring channel 303 through the apertures 304 and the associated tangential channel 306 as shown in FIG. 4 for release of the air from the ring channel 303 into the axial channel 301 to form a gaseous fuel composite made of the gas fuel 112 and at least air from the at least one source of air 201, 202, 203, 204, and 205. Further, at least a connection between one of the apertures 304 and the associated tangential channels 306 includes a first curved aerodynamic channel amplifier 305 having a first curvature as shown in FIG. 3.

In one embodiment, the outlet 108 is a nozzle as shown in FIG. 1. In another embodiment, the gas fuel 112 is natural gas made of, for example, methane. In another embodiment, the device 10 is used in a commercial burner (not shown). As shown in FIG. 1, the inlet 101 is a cylindrical gas inlet. In another embodiment shown in FIG. 18, at least another connection between one of the apertures and the associated tangential channel includes a second curved aerodynamic channel amplifier having a second curvature 1105 when compared with 1104. FIG. 17 also shows an embodiment where at least one of the plurality of vortex generators includes a conical 111 axial channel.

What is also described is a system for the production of a gaseous fuel composite comprising the process of transforming a gas fuel into a gaseous fuel composite by successive steps of connecting a device for the production of a gaseous fuel composite to an inlet connected to a source of gas fuel as shown by the black arrows at the bottom of FIG. 2, the system having a plurality of vortex generators each with an axial channel as shown, and aerating the gas fuel 112 as shown, for example, in FIG. 7 with a stream of air 402 traveling from the ring channel via at least one of the plurality of apertures 501 and associated tangential channels into the axial channel for mixture of a first quantity of air with the gas fuel 701, 702 using one of the plurality of vortex generators as shown. The stream of air includes an upward motion created by the first curvature 401 and a circular motion 403 as shown in FIG. 5 to form a gaseous fuel composite as shown by the arrows in the upper portion of FIG. 2.

There may be a subsequent step of using at least a second vortex generator for further aerating the gaseous fuel composite in a multistage process. Finally, a gaseous fuel composite as shown by the arrows in black in the upper portion of FIG. 2 is made of a first gas fuel 112 traveling linearly as shown by the arrows in the bottom of FIG. 2 and aerated by a series of at least two streams at different staggered distances along a linear axial chamber where each stream includes kinetic energy in the form of a circular motion 403 of FIG. 5 and kinetic energy in the form of an upward motion 402 of FIG. 6, and where the stream is further compressed and accelerated in the axial chamber as shown by the arrows 1101 in FIG. 11 by a conical reduction of the axial chamber and a nozzle release.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A system for the production of a gaseous fuel composite, comprising the process of transforming a gas fuel into a gaseous fuel composite by successive steps of:
   connecting a device for the production of a gaseous fuel composite to an inlet connected a source of gas fuel having a plurality of vortex generators each with an axial channel, the generators being in a stacked configuration in relation to the other vortex generators in a housing between the inlet and an outlet, wherein each of the vortex generators including a flange defining a ring channel and a plurality of apertures and associated tangential channels, wherein at least a connection between one of the apertures and the associated tangential channel includes a first curved aerodynamic channel amplifier having a first curvature, and
   aerating the gas fuel with a stream of air traveling from the ring channel via at least one of the plurality of apertures and associated tangential channel into the axial channel for mixture of a first quantity of air with the gas fuel using one of the plurality of vortex generators, and wherein the stream of air includes an upward motion created by the first curvature and a circular motion to form a gaseous fuel composite.

2. The system of claim 1, further comprising a subsequent step of using at least a second vortex generator for further aerating the gaseous fuel composite.

3. The system of claim 1, wherein the gaseous fuel composite is released from the device at a nozzle.

4. The system of claim 1, wherein the gas fuel is natural gas and the system is used to improve the performances of a commercial burner.

5. The system of claim 1, wherein at least another connection between one of the apertures and the associated tangential channel includes a second curved aerodynamic channel amplifier having a second curvature.

6. The system of claim 1, wherein at least one of the plurality of vortex generators includes a conical axial channel.

* * * * *